(12) United States Patent
Matsumoto

(10) Patent No.: US 6,868,922 B2
(45) Date of Patent: Mar. 22, 2005

(54) METHOD FOR MEASURING DIGGING POSITIONS

(75) Inventor: Shigetaka Matsumoto, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 10/006,742

(22) Filed: Nov. 8, 2001

(65) Prior Publication Data

US 2004/0046558 A1 Mar. 11, 2004

(30) Foreign Application Priority Data

Nov. 10, 2000 (JP) ......................................... 2000/343546
Dec. 28, 2000 (JP) ......................................... 2000/401247

(51) Int. Cl.⁷ .............................................. E21B 25/16
(52) U.S. Cl. ........................................ 175/45; 324/326
(58) Field of Search ................................ 324/326, 329; 175/45, 26

(56) References Cited

U.S. PATENT DOCUMENTS 5,258,755 A * 11/1993 Kuckes ..................... 340/853.5
6,411,094 B1 * 6/2002 Gard et al. ................. 324/326

* cited by examiner

*Primary Examiner*—William Neuder
(74) *Attorney, Agent, or Firm*—Myron Greenspan, Esq.; Laokenbach Siegel LLC

(57) ABSTRACT

A method for determining position is disclosed, one that is highly reliable in determining a digging position. This method involves the capacity to sense, on the ground, an AC magnetic field generated by a coil housed in a digging head even when there are other noise magnetic fields present that could affect position determination. This method is used in a non-open-cut (boring or trenching) dig. It senses the senses the AC magnetic field provided from a magnetic field source by means of an above-ground magnetic sensor and calculates the position of the magnetic field source from the magnitude and direction of the sensed AC magnetic field. When another noise magnetic field is generated by a nearby current, the magnetic field sensed by the magnetic sensor is projected onto a flat plane or straight line orthogonal to a vector-valued direction of the noise magnetic field, and the projective component is used to calculate the following: at least one position of the magnetic field source; the tilt angle of the magnetic field source, its inclination to the vertical direction; and the azimuth direction of the magnetic field source, its axial direction in a horizontal plane.

26 Claims, 31 Drawing Sheets

PLANE PERPENDICULAR TO VERTICAL DIRECTION

METHOD FOR MEASURING DIGGING
POSITIONS

BACKGROUND OF INVENTION

1. Field of the Invention

The present invention relates to a method of determining the digging position of a digging head in a substantially horizontal digging or excavation and, more particularly, to a method that ensures accuracy in determining positions of the digging head by lessening the influence of noise magnetic field frequency components close to the signal magnetic field to be measured.

2. Brief Description of the Prior Art

A horizontal drilling method, which is one of the boring or trenching methods of this kind, uses a small-diameter pipe of 100 mm or less for horizontally digging in the ground, and, accordingly, the kind of precision position-determining apparatus used in an ordinary small-diameter driving method of excavation cannot be placed near a drill. To solve this problem, it is customary in the art to generate an AC magnetic field by means a coil mounted in the drill head that is detected by an above-ground magnetic sensor like a coil to determine the current digging position.

This method is simple and easy, but since the magnetic field by the coil is a dipolar magnetic field, the field rapidly attenuates with distance from the coil. The method is defective in that it is unable to achieve a highly reliable determination of the digging position when a power line or similar magnetic noise source is present in or around the place where the position determination is to be performed.

SUMMARY OF THE INVENTION

An object of the present invention is to provide a position-determination method that permits highly reliable determination of the digging position by detecting the AC signal magnetic field from a coil housed in a drill head even if another noise magnetic field is present that might have an effect on the determination of the digging position.

To attain the above object, a method for determining digging position, for a boring or trenching excavation, according to the present invention, which (1) senses an AC magnetic field from a magnetic field source by means of a magnetic sensor provided on the ground and (2) calculates the position of the magnetic field source from the magnitude and direction of the magnetic field that is sensed. This method's construction is characterized by several features.

In situations where there is, in addition to the signal magnetic field generated by the magnetic field source, another noise magnetic field generated by a nearby current, at least one of the positions of said magnetic field source—the tilt angle of said magnetic field source to the vertical direction and the azimuth angle of its axial direction of said magnetic field source in a horizontal plane—is calculated from a projecting component of the magnetic field sensed by the magnetic sensor and projected on a plane or straight line orthogonal to a vector-valued direction of the noise magnetic field.

In this regard, it is useful to review the investigation and research relating to useful utilization techniques of energy resources entitled "Research for Low-Loss Energizing Techniques in Establishment of Advanced Telecommunications Networks" (the Composite Development System for New Energy Industrial Technique). Here, external noise magnetic fields, which affect the determination of position in a boring or trenching method of excavation, are determined to be primarily generated by a current of some kind. In this case, the magnitude of the noise magnetic field varies irregularly with time, but its vector-valued direction is constant at each field-sensing position.

The present invention attains its object through the adoption of the following steps:

(A) The direction of the noise magnetic field is detected, and a sensed magnetic field in which the noise magnetic field and a signal magnetic field are mixed is projected on a plane or straight line orthogonal to the direction of the noise magnetic field to obtain a projective component Since the projective component is theoretically free from a component derived from the noise magnetic field, at lease one of the position, azimuth angle and tilt angle of the magnetic field source is calculated so that the magnitude of the projective component (in the case of projection on the straight line) or it magnitude and direction (in the case of projection on the plane) is substantially equal to a theoretically calculated value of a corresponding quantity of a magnetic field generated from a magnetic field source, or, has a minimum difference between the former and the latter. The sensed magnetic field is obtained by sensing magnetic fields at different positions whose number is determined by how many ones of the position, azimuth angle and tilt angle of the magnetic field source are unknowns and how such unknowns are calculated.

(B) To obtain the noise magnetic field (1) when the number of noise magnetic fields is virtually one, the noise magnetic field is sensed to obtain its direction essentially in the absence of a signal magnetic field; or When the noise magnetic field has frequency components at frequencies different from that of the signal magnetic field, the frequency components are measured to obtain the direction of the noise magnetic field.

(2) When the number of magnetic fields is virtually two, the frequency components of a first one of the two noise magnetic fields, which are widely spaced from the frequency components of the second noise magnetic field and the signal magnetic field, are measured to obtain the vector direction of the first noise magnetic field, and the frequency components of the second noise magnetic field, which are widely spaced from the frequency components of the first noise magnetic field and the signal magnetic field, are measured to obtain the vector direction of the second noise magnetic field.

BRIEF DESCRIPTION OF THE DRAWINGS

The features of the present invention will be clearly understood from the following description taken in conjunction with the accompanying drawings, in which.

DETAILED DESCRIPTION OF THE INVENTION

Figure 1A:
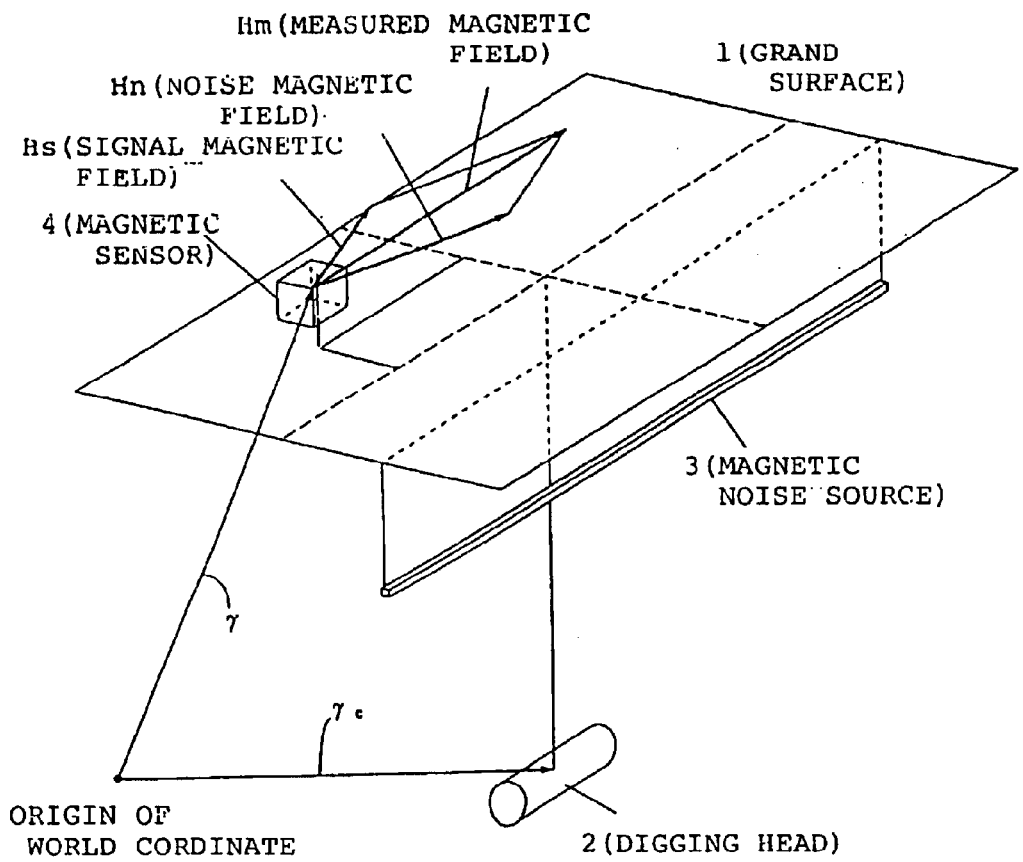
FIG. 1 is a perspective view that shows the placement of a magnetic sensor according to the method of the present invention.
Figure 1B:
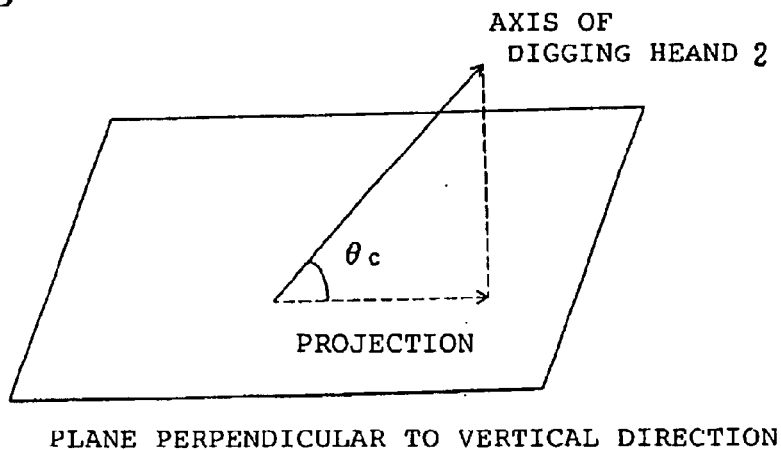

As depicted in FIG. 1, the position of a digging head 2 under the ground surface 1, which creates a signal magnetic field source to be sensed, is determined using a magnetic sensor 4 placed on the ground surface 1 at a proper position at the same time that a power line or similar magnetic noise source 3, which generates a noise magnetic field, is placed near the digging position to be determined. More specifically, a signal magnetic field vector $H_s$ is provided from the digging head 2 and a noise magnetic field vector $H_n$ is provided from the magnetic noise source 3, such as power line. In this case, the magnetic sensor 4 senses a resulting vector $H_m$ that is a combined version of the signal magnetic field vector $H_s$ and the noise magnetic field vector $H_n$.

Figure 2:
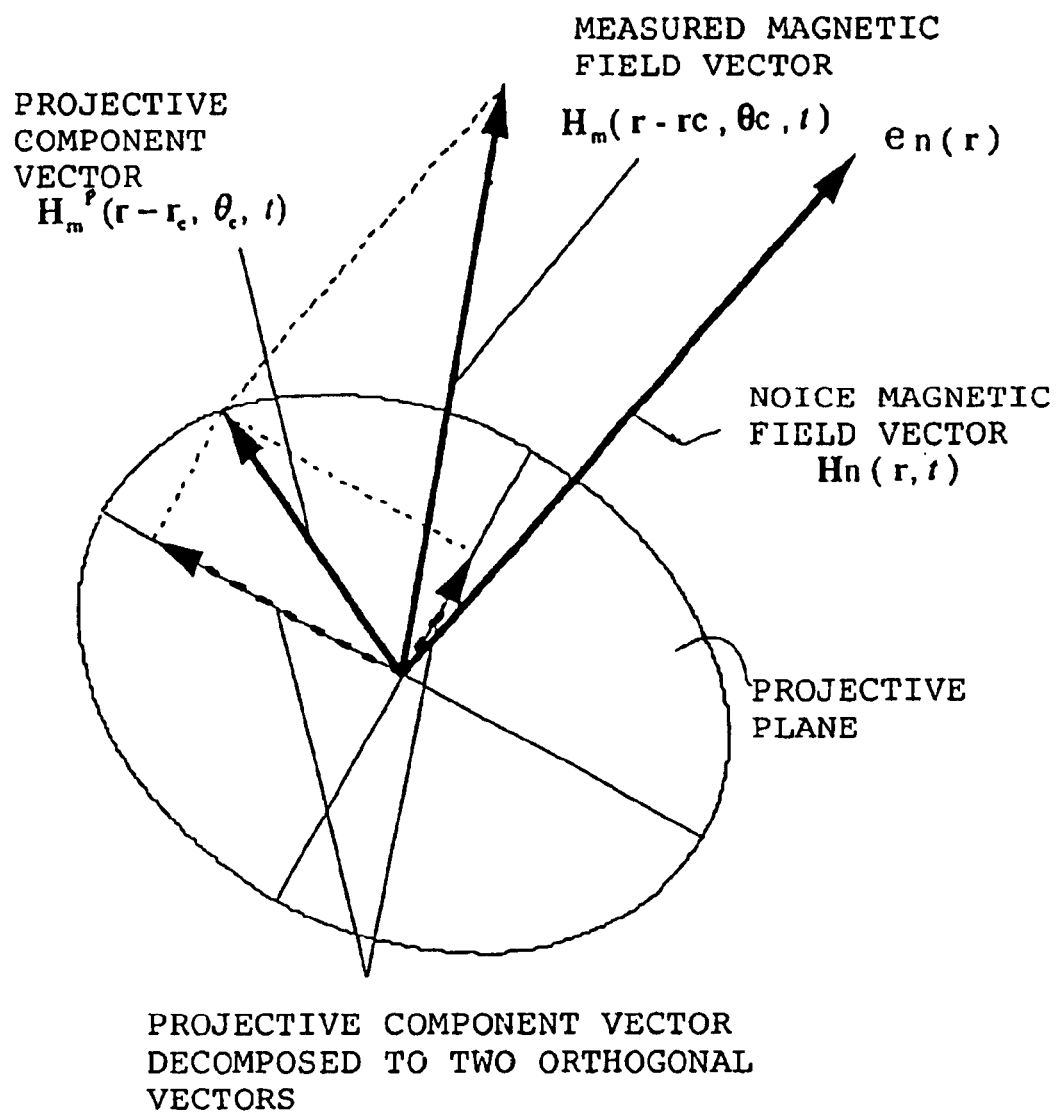
FIG. 2 is a vector diagram showing the principle of measurement according to the method of the present invention where there is one noise magnetic field source.

Referring to FIG. 2, a noise magnetic field of a position vector $r$ and at tie $t$ is identified as a vector $H_n(r, t)$. On the other hand, the signal magnetic field generated by magnetic field generating means for position sensing is identified as the vector $H_s(r-r_c, \theta_c, t)$. Here the vector $\theta_c$ is the angle of orientation of the magnetic field generating means, which is defined by three angles of rotation in the coordinate system fixed to the ground that is the coordinate system fixed to the magnetic field generating means.

Because the noise magnetic field and the signal magnetic field are sensed simultaneously, and because the noise magnetic field vector $H_n([t] r, t)$ varies randomly with time, it is only possible to extract the signal magnetic field vector $H_s(r-r_c, \theta_c, t)$ from the measured magnetic field vector $H_m(r-r_c, \theta_c, t)$ if the statistical properties of the noise magnetic field are known and the noise magnetic field is signal-wise orthogonal to the signal magnetic field. And even if the statistical properties separating the noise magnetic field from the signal magnetic field are known prior to determining the latter's position, this separation comprises a large amount of data, and therefore the conventional scheme is never practical.

Figure 4:
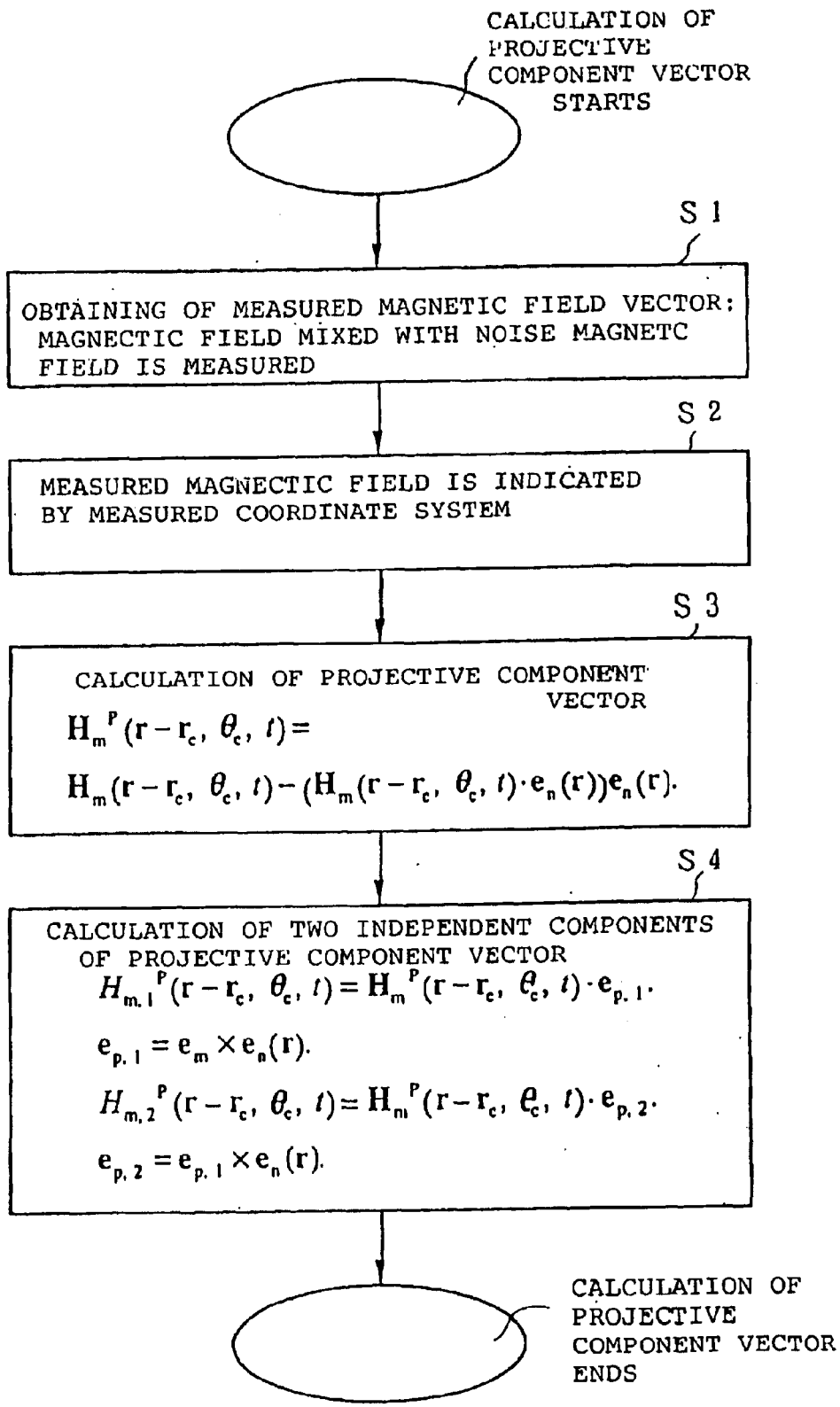
FIG. 4 is a flowchart illustrating a procedure for obtaining a projective component according to the method of the present invention where there is one noise magnetic field source.

According to the present invention, the direction of a vector $e_n(r)$ of the noise magnetic field vector $H_n(r, t)$ is obtained by separated means and in a coordinate system shown in FIG. 2, where a component vector $H_m^P(r-r_c, \theta_c, t)$, is projected onto a plane vertical to the direction of a vector $e_n(r)$ of the measured magnetic field vector $H_m(r-r_c, \theta_c, t)$, as shown in FIG. 4 (S1, S2, S3).

$$H_m^P(r-r_c, \theta_c, t) = H_m(r-r_c, \theta_c, t) - (H_m(r-r_c, \theta_c, t) \cdot e_n(r))e_n(r). \quad (1)$$

This component does not contain the noise magnetic field for the reason given below. Since $$H_m^P(r-r_c, \theta_c, t) = H_s(r-r_c, \theta_c, t) + H_n(r, t) = H_s(r-r_c, \theta_c, t) + |H_n(r, t)|e_n(r). \quad (2)$$

it follows that $$H_m^P(r-r_c, \theta_c, t) = H_s(r-r_c, \theta_c, t) - (H_s(r-r_c, \theta_c, t) \cdot e_n(r))e_n(r). \quad (3)$$

from which it can be seen that the projective component vector $H_m^P(r-r_c, \theta_c, t)$ does not contain the component of the noise magnetic field vector $H_n(r, t)$.

However, the projective component vector $H_m^P(r-r_c, \theta_c, t)$ has lost information of one axis by the projection onto a plane normal to the direction of the vector $e_n(r)$. That is, since the same projective components are obtained regardless of the magnitude of a component parallel to the vector $e_n(r)$, two independent components are obtained Although any method can be used to obtain the two independent components, it is possible to use the method described below.

That coordinate axis of a measurement coordinate system $C_M$ (described below) that is not parallel to the direction $e_n(r)$ of the noise magnetic field vector $H_n(r, t)$ is chosen. A unit vector in the direction of the chosen coordinate axis is identified as vector $e_m$. A vector product, $e_{p,1} = e_m \times e_n(r)$, of the unit vector and the direction $e_n(r)$ is perpendicular to the direction of the vector $e_n(r)$ and hence contained in the plane of projection and perpendicular to the coordinate axis $e_m$. The magnitude of the vector obtained by projecting the projective component vector $H_m^P(r-r_c, \theta_c, t)$ in the direction of the vector $e_{p,1}$, including the direction of the vector, is represented (S4) by a value of $H_{m,1}^P(r-r_c, \theta_c, t)$. That is, $$H_{m,1}^P(r-r_c, \theta_c, t) = H_m^P(r-r_c, \theta_c, t) \cdot e_{p,1}. \quad (4)$$

$$e_{p,1} = e_m \times e_n(r). \quad (5)$$

The next step is to calculate a vector $e_{p,2}$ perpendicular to the direction of the vectors $e_{p,1}$ and $e_n(r)$. The direction of the vector $e_{p,2}$ is also perpendicular to the direction of the vector $e_n(r)$ and hence contained in the plane of projection and perpendicular to the direction of the vector $e_{p,1}$ as well. If the projection of the projective component vector $H_m^P(r-r_c, \theta_c, t)$ in this direction is represented by $H_{m,2}^P(r-r_c, \theta_c, t)$, values $H_{m,1}^P(r-r_c, \theta_c, t)e_{p,1}$ and $H_{m,2}^P(r-r_c, \theta_c, t)e_{p,2}$ represent two independent vectors into which the projective component vector $H_m^P(r-r_c, \theta_c, t)$ is separated. Here, $$H_{m,2}^P(r-r_c, \theta_c, t) = H_m^P(r-r_c, \theta_c, t) \cdot e_{p,2}. \quad (6)$$

$$e_{p,2} = e_{p,1} \times e_n(r). \quad (7)$$

By setting the position vector $r_c$ and the angle of orientation $\theta_c$ of the magnetic field source so that a theoretically calculated magnetic field, $H_e(r-r_c, \theta_c, t)$ generated by the magnetic field source of the position vector r substantially matches the projective component $H_e^P(r-r_c, \theta_c, t)$ on the same plane as that of the measured magnetic field, it becomes possible to detect the position and orientation of the magnetic field source.

Figure 3:
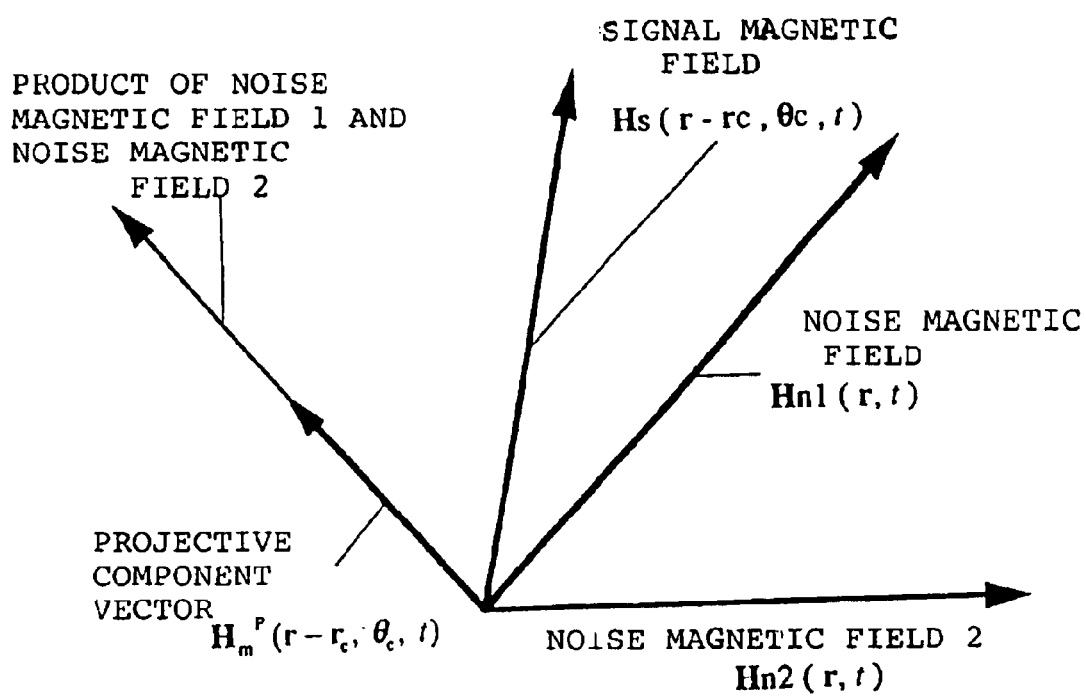
FIG. 3 is a vector diagram showing the principle of measurement according to the method of the present invention where there are two noise magnetic field sources.
Figure 5:
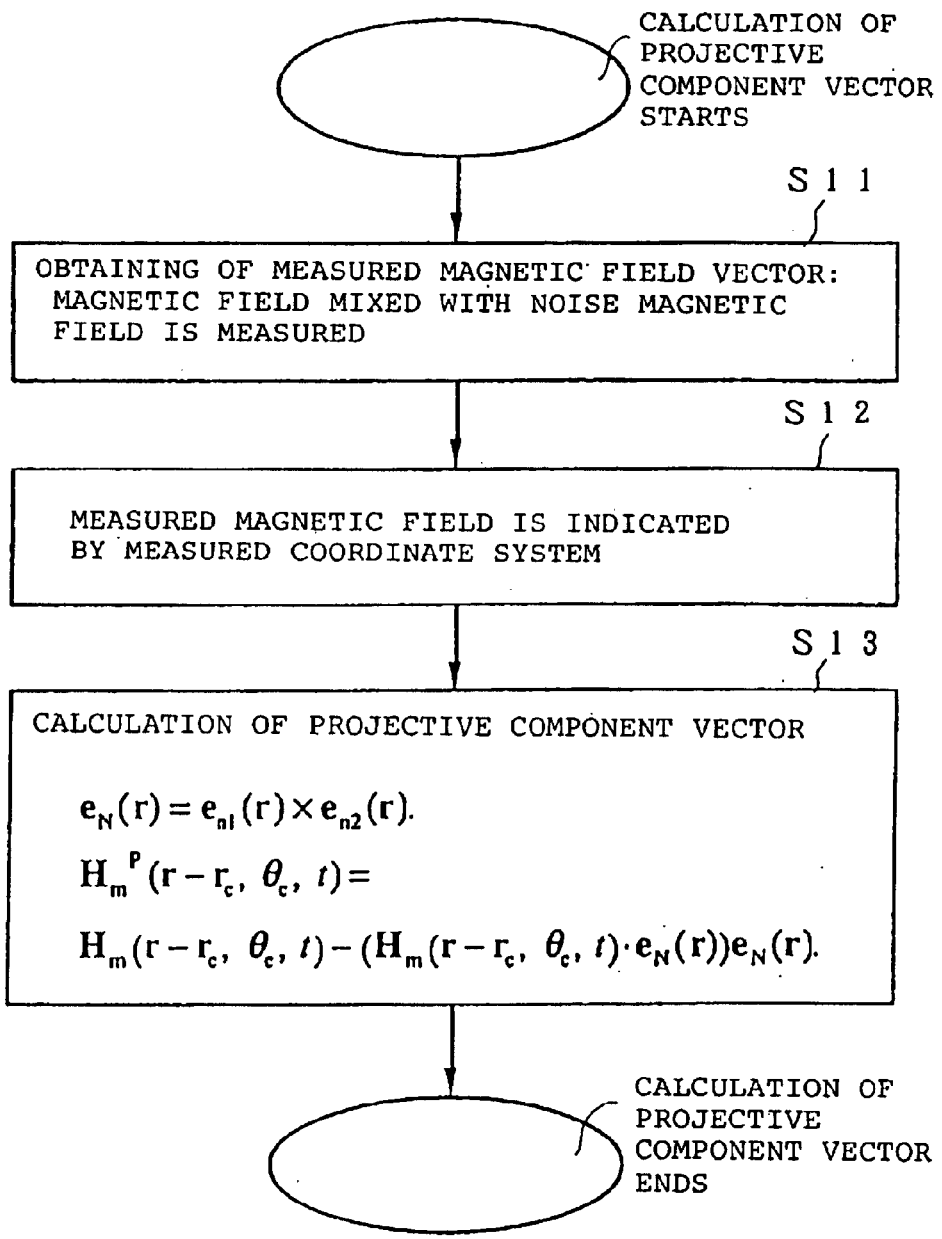
FIG. 5 is a flowchart illustrating a procedure for obtaining a projective component according to the method of the present invention where there are two noise magnetic field sources.

The above analysis treats a situation where the number of noise magnetic fields is virtually one. When the number of noise magnetic fields is two, the direction of two noise magnetic fields $H_{n_j}(r, t)$, where j=1, 2, may be represented by vectors $e_{n1}(r)$ and $e_{n2}(r)$, and the projection of the measured magnetic field on a direction vector $e_N(r)=e_{n1}(r) \times e_{n2}(r)$ in the coordinate system of FIG. 3 is used as depicted in FIG. 5. That is, $$H_m^P(r-r_c, \theta_c, t) = H_m(r-r_c, \theta_c, t) - (H_m(r-r_c, \theta_c, t) \cdot e_N(r))e_N(r). \quad (8)$$

is calculated (S11, S12, S13). In the above statement, $$e_N(r) = e_{n1}(r) \times e_{n2}(r). \quad (9)$$

where the symbol "×" indicates a vector product. In this instance, an independent component in the projective component is one, that is, only the magnitude of the vector.

If the coordinates of the magnetic field source are represented by vector $r_c(x, y, z)$ and its angle of orientation by vector $\theta_c(\theta_x, \theta_y, \theta_z)$ where $\theta_x, \theta_y$ and $\theta_z$ are referred to as an angle of rotation, a tilt angle and an azimuth, respectively, when the signal magnetic field is axially symmetric, the axis of symmetry is regarded as the x-axis, and the angle of orientation is set to vector $\theta_c(\theta_y, \theta_z)$.

Further, according to the present invention, it is possible to calculate the magnitude $H_m(r-r_c, \theta_c)$ of each component of the original signal magnetic field vector $H_m(r-r_c, \theta_c, t)$ by using the synchronous detection of the measured magnetic field vector $H_m(r-r_c, \theta_c, t)$ through the use of a proper one component in Eq. (1) or (6) that is a projective component.

$$H_s(r-r_c, \theta_c) = <H_m(r-r_c, \theta_c, t)H_m^P(r-r_c, \theta_c, t)>_t. \quad (10)$$

In the above, $H_m^P(r-r_c, \theta_c, t)$ is a proper component of the projective component given in Eq. (1) or (6).

FIG. 4 illustrates a case where the number of noise magnetic field sources is essentially one. The processing of FIG. 4 is repeated at each measuring point. In a situation where there are essentially two noise magnetic fields, the processing shown in FIG. 5 is similarly repeated at each measuring point as is the case with FIG. 4.

Figure 6:
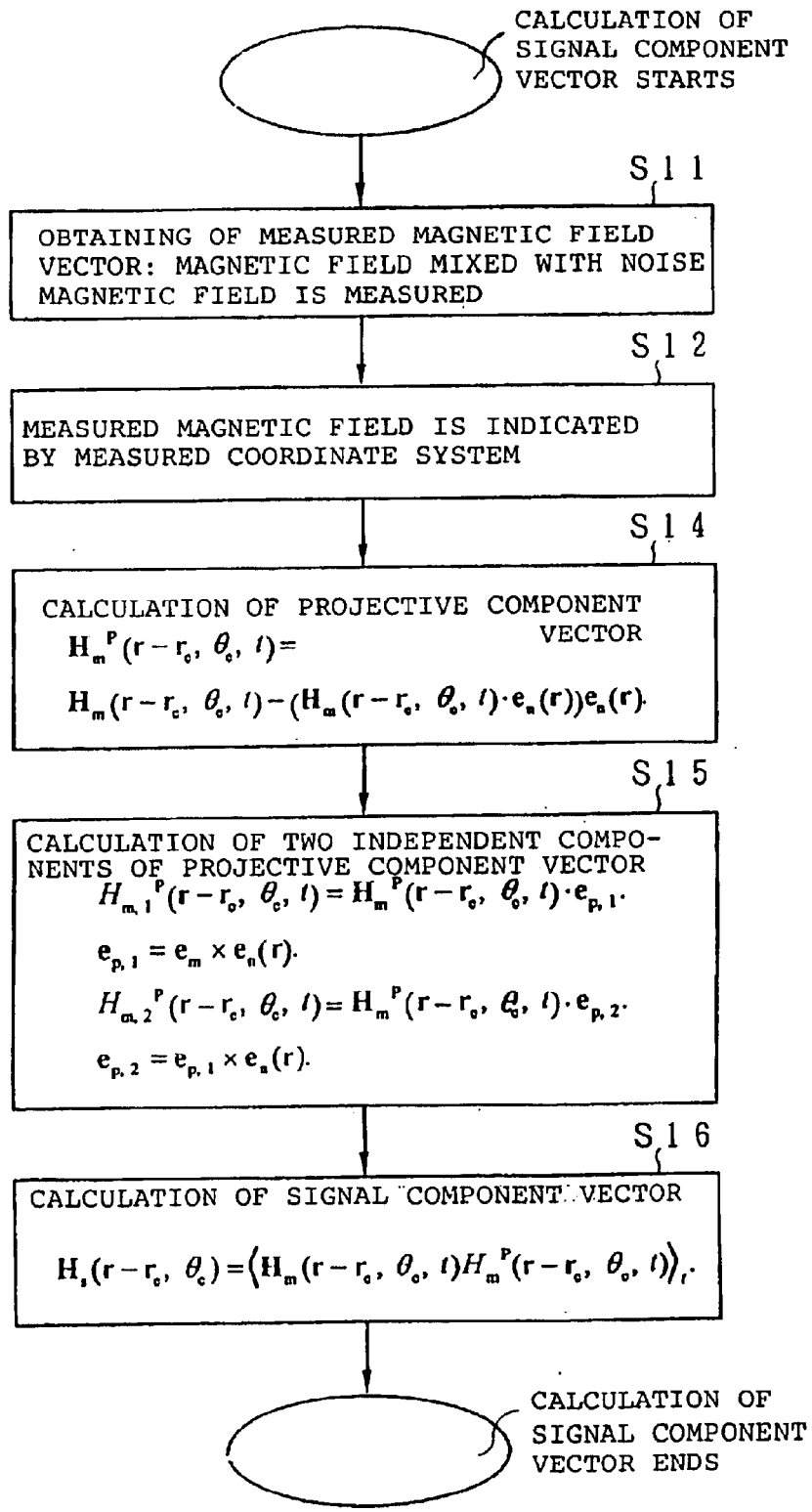
FIG. 6 is a flowchart illustrating a procedure for obtaining a signal magnetic field where there is one noise magnetic field.
Figure 7:
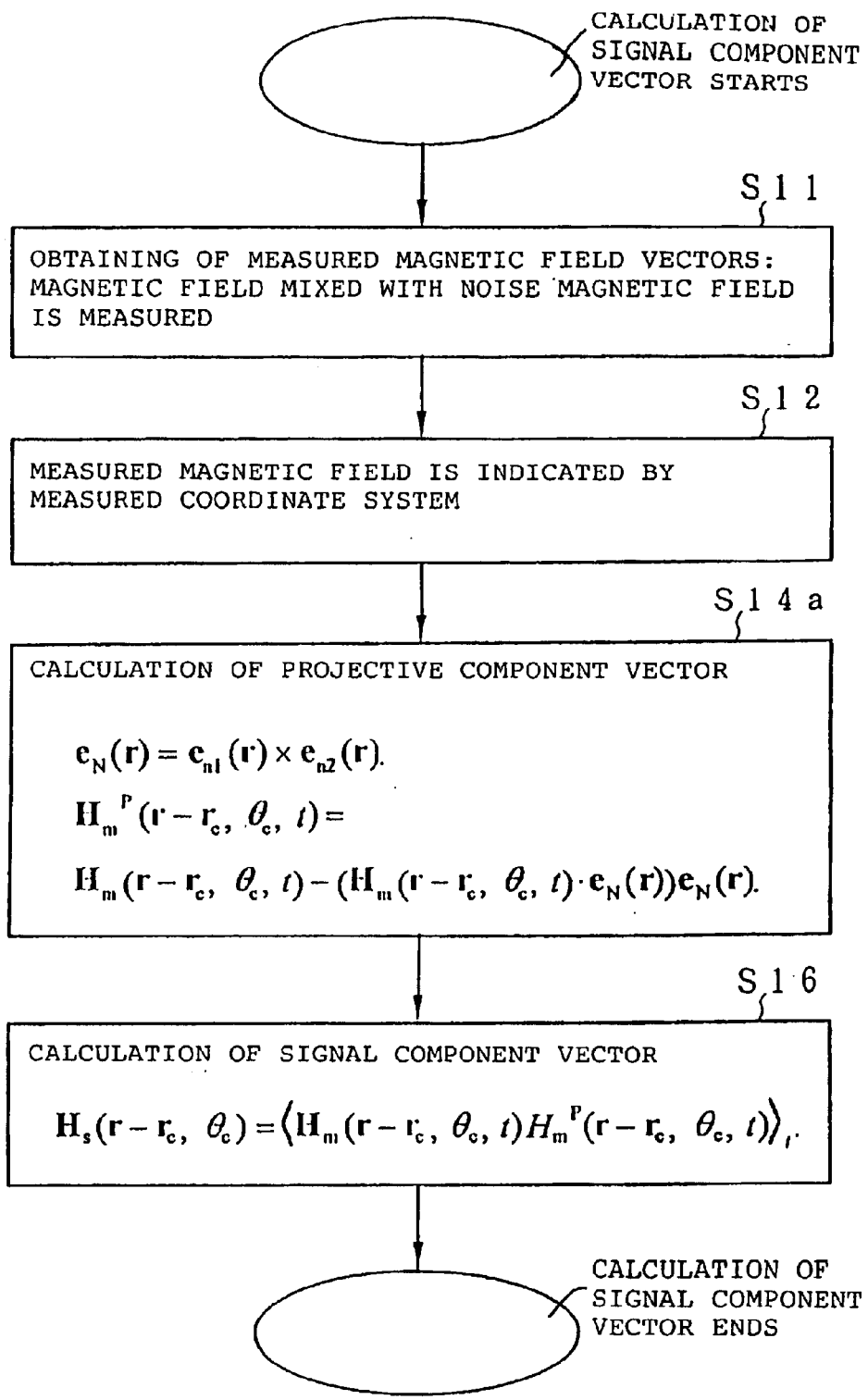
FIG. 7 is a flowchart illustrating a procedure for obtaining a signal magnetic field where there are two noise magnetic fields.

The magnitude $H_m(r-r_c, \theta_c, t)$ of the original signal magnetic field $H_m(r-r_c, \theta_c, t)$ can be obtained by calculating Eq. (10) after calculating the projective component at each measuring point. Concretely, the process shown in FIG. 6 or 7 is performed (S11, S12, S14, S15, S16) or (S11, S12, S14a, S16).

How to Calculate the Position and Angle of Orientation (1) Definitions of the coordinate system and the angle of orientation:

A coordinate system is set, one that is fixed to the earth with the z-axis in a vertical direction (upward). This system will hereinafter be referred to as the measuring coordinate system vector $C_M$. The x- and y-axes are properly set so that they form a right-hand system. For example, they are parallel to the direction of projection of the side of a measuring frame is projected onto a horizontal plane.

The goal here is to calculate the coordinate vector $r_c(x, y, z)$ and the angle-of-orientation vector $\theta_c(\theta_x, \theta_y, \theta_z)$ of the magnetic field source in the coordinate system.

Like the coordinate system vector $C_c$ of the magnetic field source, a coordinate system with the axial direction of the magnetic field source as the x-axis is disposed so that the y- and z-axes are horizontal and vertical (upward), respectively, when the magnetic field source is placed horizontally.

The angle-of-orientation vector $\theta_c$ of the magnetic field source is defined as the angle of rotation between the measuring coordinate system vector $C_M$ and the coordinate system vector $C_c$ as described below. First, a coordinate system $C_{c0}$ parallel to the measuring coordinate system vector $C_M$ is turned by an azimuth angle $\theta_z$ about the z-axis (in either coordinate system). This coordinate system will be referred to as coordinate system vector $C_{c1}$. Next, the coordinate system vector $C_{c1}$ is turned by a tilt angle $\theta_y$ about the y-axis of the coordinate system vector $C_{c1}$ itself. This coordinate system will be referred to as the coordinate system vector $C_{c2}$. Additionally, the coordinate system vector $C_{c2}$ is turned by an angle of rotation $\theta_x$ about the x-axis of the coordinate system vector $C_{c2}$ itself. The angle-of-orientation vector $\theta_c$ is determined so that the resulting coordinate system becomes the coordinate system vector $C_c$.

(2) Explanation of independent measurands and unknowns:

When the number of noise magnetic fields is essentially one, the measurement of the magnetic field at one place will provide two independent measured parameters ("measurands"). When the number of noise magnetic fields is essentially two, the measurement of the magnetic field at one place will provide one independent measurand. In situations where components of the original signal magnetic field are obtained by synchronous detection, the measurement of the magnetic field at one place will provide three independent measurands. In contrast, three coordinate components of the coordinate vector $r_c(x, y, z)$ of the magnetic field source are unknowns. The azimuth angle $\theta_z$ is not obtainable without a different criterion such as the direction of the earth nagnetism, and therefore the azimuth angle is also an unknown unless the digging head is provided with a direction sensor. When the digging head is made of a magnetic material, or when a buried steel pipe or similar magnetic body lies near the digging head, an accurate direction cannot be obtained even if the direction sensor is provided and so the azimuth angle $\theta_z$ is an unknown in many cases, The tilt angle $\theta_y$ can easily be detected by a tilt angle sensor that detects the vertical direction, and hence it is known in many cases. The same is true of the angle of rotation $\theta_x$. In particular, when the signal magnetic field is axially symmetric, if the axis of symmetry is regarded as the x-axis, the angle of rotation $\theta_x$ becomes meaningless and can be ignored.

At any rate, measured magnetic fields need only to be obtained at different positions so that independent measurands are larger in number than unknowns.

Figure 8:
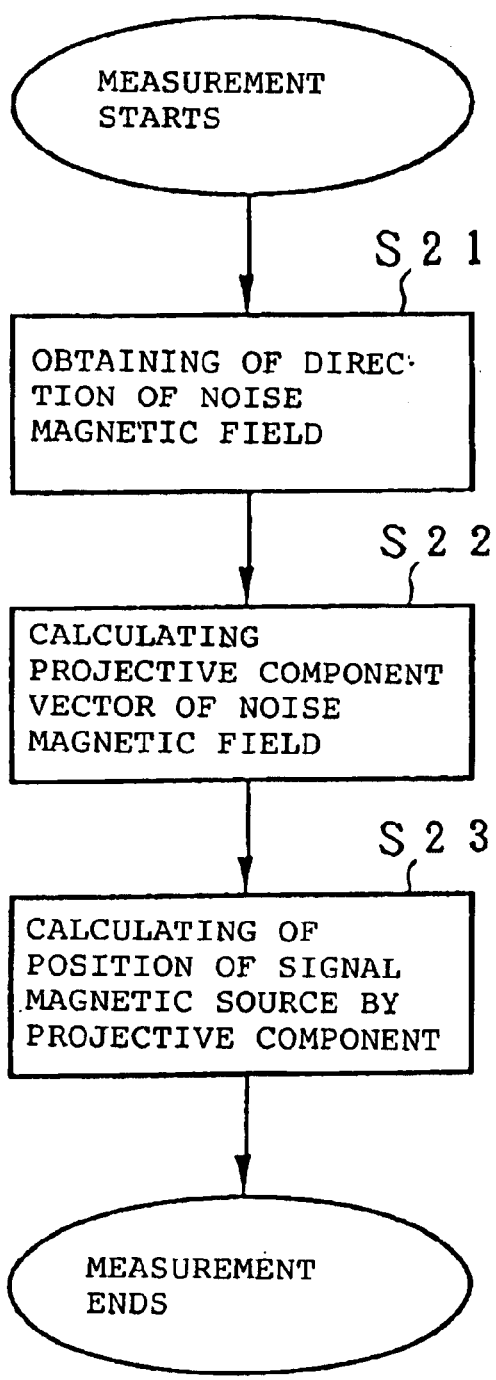
FIG. 8 is a flowchart showing a measurement procedure according to the method of the present invention.

Arrangement of the measuring system:

As shown in FIG. 1, for example, magnetic fields are measured using a required number of three-axis magnetic sensors disposed on the ground so that their relative positions are known. Because the direction of the noise magnetic field changes for each position of measurement, it is necessary to perform for each position the step (S21) for detecting the position of the noise magnetic field and the step (S22) for calculating the projective component of the measured magnetic field as shown in FIG. 8 a flowchart of the procedure for determining position according to the present invention. Where the component of the original signal magnetic field must be calculated by synchronous detection, the processing therefor (in a specified step) needs to be carried out for each position.

Flow of measurement processing:

Detecting (S21) the direction of the noise magnetic field, calculating (S23) the position of the signal magnetic field source using the projective component and calculating the position f of the signal magnetic field using the signal magnetic field component will now be described.

Figure 9:
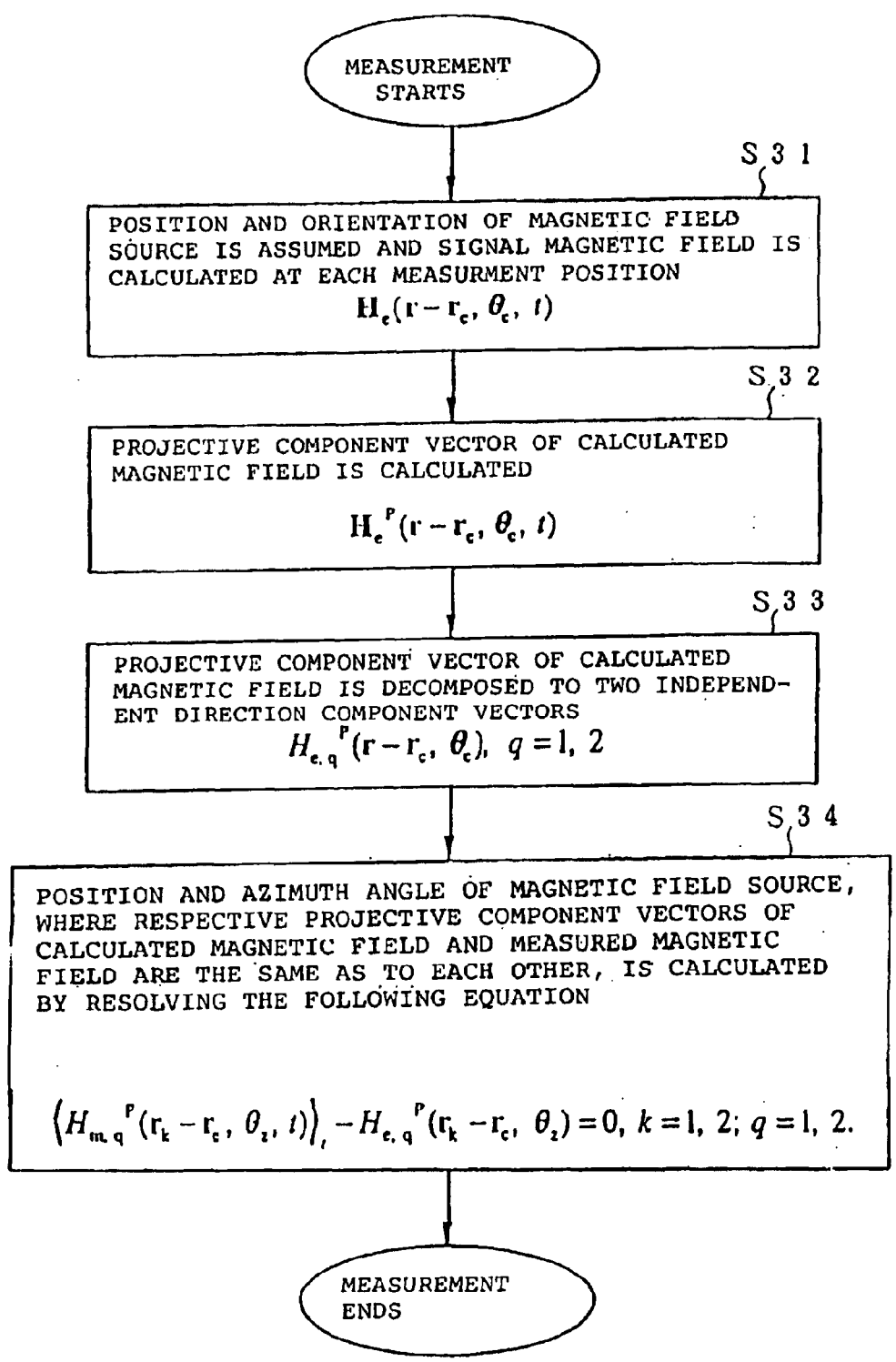
FIG. 9 is a flowchart showing a procedure for calculating the position of a signal magnetic field according to the method of the present invention where there is one noise magnetic field and where the number of unknowns and the number of equations are the same.

SITUATION I: Virtually one noise magnetic field:

When using the projective component when the number of unknowns is $N_U(\geq 1)$ and the number of noise magnetic fields is virtually one, the projective component vector $H_m^P(r-r_c, \theta_c, t)$ expressed by Eq. (1) is calculated from magnetic vectors $H_m(r-r_c, \theta_c, t)$ measured at $N_U/2$ or more different positions, and the position vector $r_c$ and the angle-of-orientation vector $\theta_c$ are determined (S31) as depicted in FIG. 9. In this way, a projective component vector at each magnetic field sensing point is essentially equal to the projective component vector $H_e^P(r-r_c, \theta_c, t)$ of a theoretically calculated magnetic field of the projective component at each position of measurement. Thus, it becomes possible to detect (S32) the position and orientation of the magnetic field source.

In a situation where the magnitude of the signal magnetic field synchronously detected by the projective component is used, the magnetic field is measured at $N_U/3$ or more different positions. When the number $N_U(\geq 1)$ of unknowns is even, the number of unknowns and the number of independent measurands can be made equal to each other, and if setting magnetic field vector $H_m(r-r_c, \theta_c, t)$ is measured at positions $N_m=N_U/2$, a $N_U$ number of such equations as given below need only to be solved.

$$<H_{m,q}^P(r_k-r_c, \theta_c, t)>_t - H_{e,q}^P(r_k-r_c, \theta_c)=0, k=1, \ldots, N_m; q=1, 2 \quad (11)$$

where q=1, 2 and represents two directions parallel to the plane of projection and parallel to each other (S33). Accordingly, $H_{m,q}^P(r-r_c, \theta_c, t)$ and $H_{e,q}^P(r-r_c, \theta_c, t)$, where q=1, 2, represent the magnitude of q-direction components of the measured magnetic field vector $H_m(r-r_c, \theta_c, t)$ and the theoretical calculated magnetic field vector $H_e(r-r_c, \theta_c, t)$, respectively. It is assumed that the vector $\theta_c$ represents any one of $\theta_x, \theta_y, \theta_z, (\theta_y, \theta_z), (\theta_z, \theta_x), (\theta_x, \theta_y), (\theta_x, \theta_y, \theta_z)$ and $\phi$, and that the vector $r_c$ represents any one of x, y, z, (y, z), (z, x), (x, y), (x, y, z) and $\phi$, where $\phi$ represents an empty set.

For example, when the position vector $r_c(x, y, z)$ and azimuth angle $\theta_z$ of the magnetic field source are unknown, the magnetic field is to be measured at two different positions and four equations such as given below are solved, by which it is possible to obtain (S34) the position vector $r_c(x, y, z)$ and azimuth angle $\theta_z$ of the magnetic field source.

$$<H_{m,q}^P(r_k-r_c, \theta_z, t)>_t - H_{e,q}^P(r_k-r_c, \theta_z)=0, k=1, 2; q=1, 2. \quad (12)$$

In the above, $<.>_t$ represents a time average.

Figure 10:
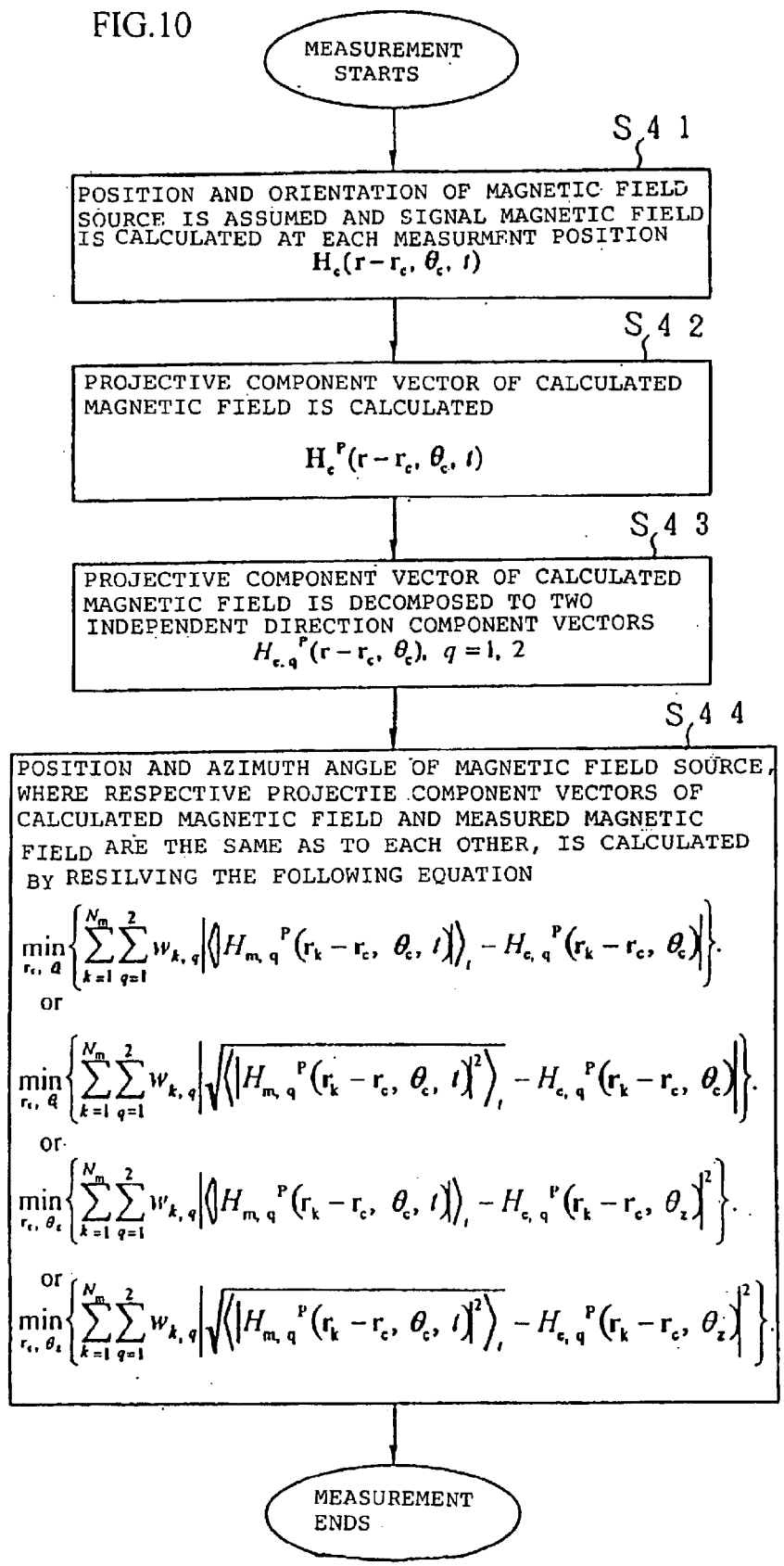
FIG. 10 is a flowchart showing a procedure for calculating the position of a signal magnetic field source according to the method of the present invention where there is one noise magnetic field source and where the number of equations is greater tan the number of unknowns.

In FIG. 10 the magnetic field is measured at $N_m(>N_U/2)$ different places more than $N_U/2$ in excess of the number $N_U$ of unknowns, since a larger number of independent measurands than the number of unknowns can be obtained (S41, S42, S43). Here, the position $r_c(e, y, z)$ and the angle of orientation $\theta_z$ are calculated and yield:

$$\min_{r_e, \theta_c}\left\{\sum_{k=1}^{N_m}\sum_{q=1}^{2} w_{k,q}|<|H_{m,q}^P(r_k-r_c, \theta_c, t)|>_t - H_{e,q}^P(r_k-r_c, \theta_c)|\right\}. \quad (13)$$

where $<.>_t$ represents the time average and $$\min_{r_c, \theta_x}\{.\}$$

means that vectors $r_c$ and $\theta_c$ are changed to obtain vectors $r_c$ and $\theta_c$, which minimize the contents in $\{.\}$. Further, a symbol $w_{k,q}$ indicates weighting. The Eq. (13) can be replaced with the following equations (S44).

$$\min_{r_e, \theta_c}\left\{\sum_{k=1}^{N_m}\sum_{q=1}^{2} w_{k,q}|\sqrt{<|H_{m,q}^P(r_k-r_c, \theta_c, t)|^2>_t} - H_{e,q}^P(r_k-r_c, \theta_c)|\right\}. \quad (14)$$

$$\min_{r_e, \theta_c}\left\{\sum_{k=1}^{N_m}\sum_{q=1}^{2} w_{k,q}|<|H_{m,q}^P(r_k-r_c, \theta_c, t)|>_t - H_{e,q}^P(r_k-r_c, \theta_z)|^2\right\}. \quad (15)$$

$$\min_{r_e, \theta_c}\left\{\sum_{k=1}^{N_m}\sum_{q=1}^{2} w_{k,q}|\sqrt{<|H_{m,q}^P(r_k-r_c, \theta_c, t)|^2>_t} - H_{e,q}^P(r_k-r_c, \theta_z)|^2\right\}. \quad (16)$$

It is assumed that vectors $r_c$ and $\theta_c$ in Eqs. (13), (14), (15) and (16) have the same meaning as in the case of Eq. (11).

In this analysis it does not matter whether the measured magnetic field vector $H_m(r-r_c, \theta_c, t)$ is a signal that has passed through a band pass filter that permits the passage of only those components close to the frequency of the signal magnetic field, or a wide-band signal that cannot pass through the band pass filter. However, using a signal that has passed through the band pass filter increases the likelihood that the position of the magnetic field will be determined with a high degree of reliability.

Figure 11:
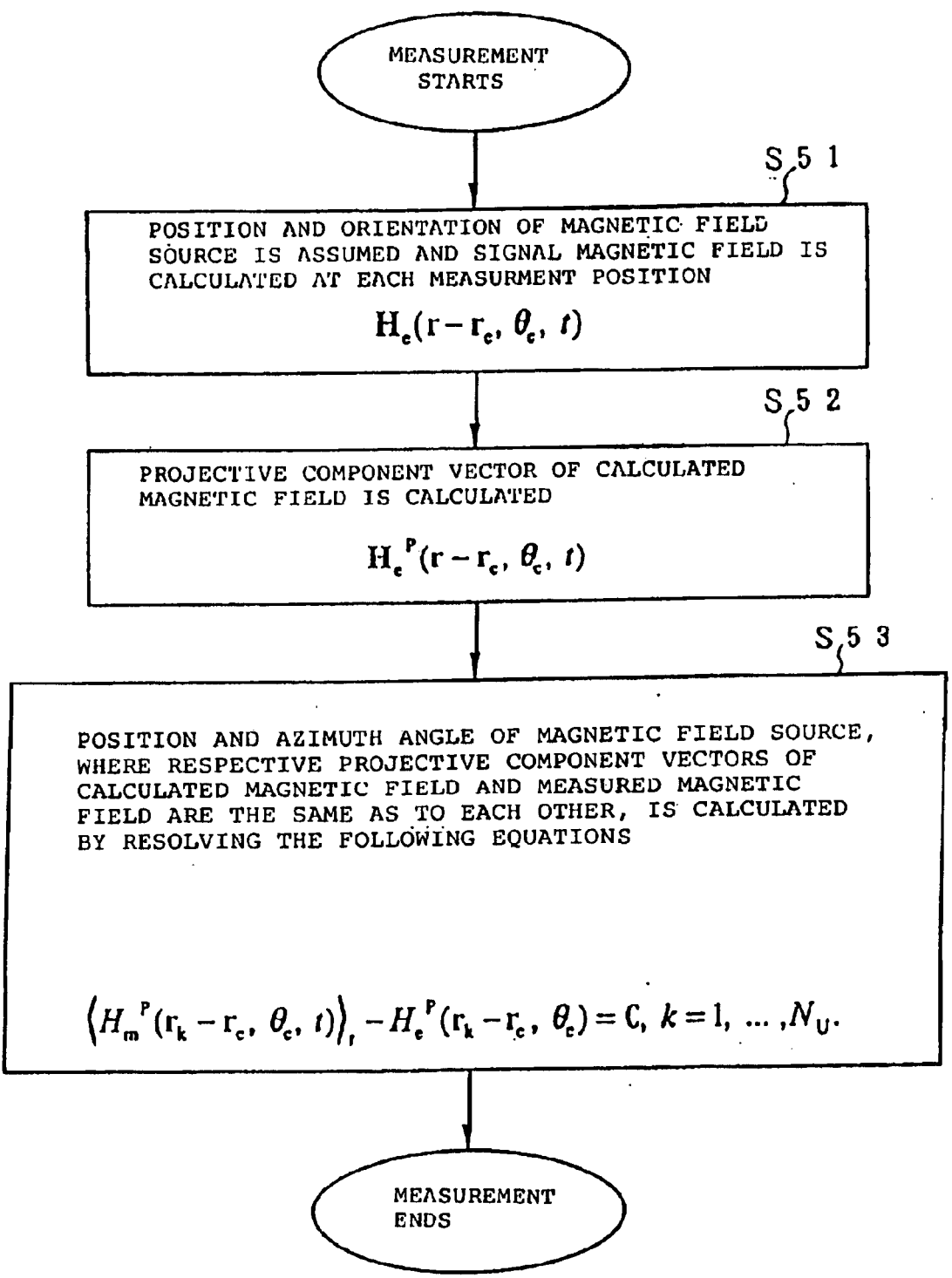
FIG. 11 is a flowchart showing a procedure for calculating the position of a signal magnetic field according to the method of the present invention where there are two noise magnetic field sources and where the number of unknowns and the number of equations are the same.

SITUATION II: Essentially two noise magnetic fields:

When the number of unknowns is $N_U(\geq 1)$ and the number of noise magnetic fields is virtually two, the projective component vector $H_m^P(r-r_c, \theta_c, t)$ expressed by Eq. (4) is calculated from magnetic vectors $H_m(r-r_c, \theta_c, t)$ measured at $N_U/2$ or more different positions, and the position vector $r_c$ and the angle-of-orientation vector $\theta_c$ are determined (S51, S52) as depicted in FIG. 11. Thus, the abovementioned projective component vector obtained at each position of measurement essentially matches the projective component vector $H_e^P(r-r_c, \theta_c, t)$ of a theoretically calculated magnetic field at each position of measurement. By this means it is possible to detect (S53) the position and orientation of the magnetic field source.

In this situation, the number $N_U(\geq 1)$ of unknowns and the number of independent measurands can always be made to be equal to each other; the magnetic field vector $H_m(r-r_c, \theta_c, t)$ is measured at different positions of the same number as that $N_U$ number of unknowns, and $N_U$ number of such equations given below need only to be solved.

$$<H_m^P(r_k-r_c, \theta_c, t)>_t - H_e^P(r_k-r_c, \theta_c)=0, k=1, \ldots, N_U. \quad (17)$$

Here, the symbols $H_m^P(r-r_c, \theta_c, t)$ and $H_e^P(r-r_c, \theta_c, t)$ are the respective magnitudes of the projective component vector $H_m^P(r-r_c, \theta_c, t)$ and the vector $H_e^P(r-r_c, \theta_c, t)$ of the measured magnetic field vector $H_m(r-r_c, \theta_c, t)$ and the theoretical calculated magnetic field vector $H_e(r-r_c, \theta_c, t)$. It is assumed that the vector $\theta_c$ represents any one of $\theta_x, \theta_y, \theta_z, (\theta_y, \theta_z), (\theta_z, \theta_x), (\theta_x, \theta_y), (\theta_x, \theta_y, \theta_z)$ and $\phi$ and that the vector $r_c$ represents any one of x, y, z, (y, z), (z, x), (x, y), (x, y, z) and $\phi$, where $\phi$ represents an empty set.

For example, when the position vector $r_c(x, y, z)$, azimuth angle $\theta_z$ and tilt angle $\theta_y$ of the magnetic field source are unknowns, the magnetic field is to be measured at five different positions and four such equations given below are to be solved, by which it is possible to obtain the position vector $r_c(x, y, z)$, the azimuth angle $\theta_z$ and the tilt angle $\theta_y$ of the magnetic field source.

$$<H_m^P(r_k-r_c, \theta_c, t)>_t - H_e^P(r_k-r_c, \theta_c)=0, k=1, \ldots, 5. \quad (18)$$

In the above, $<.>_t$ represents a time average, and the vector $\theta_c = \theta_c(\theta_y, \theta_z)$.

Figure 12:
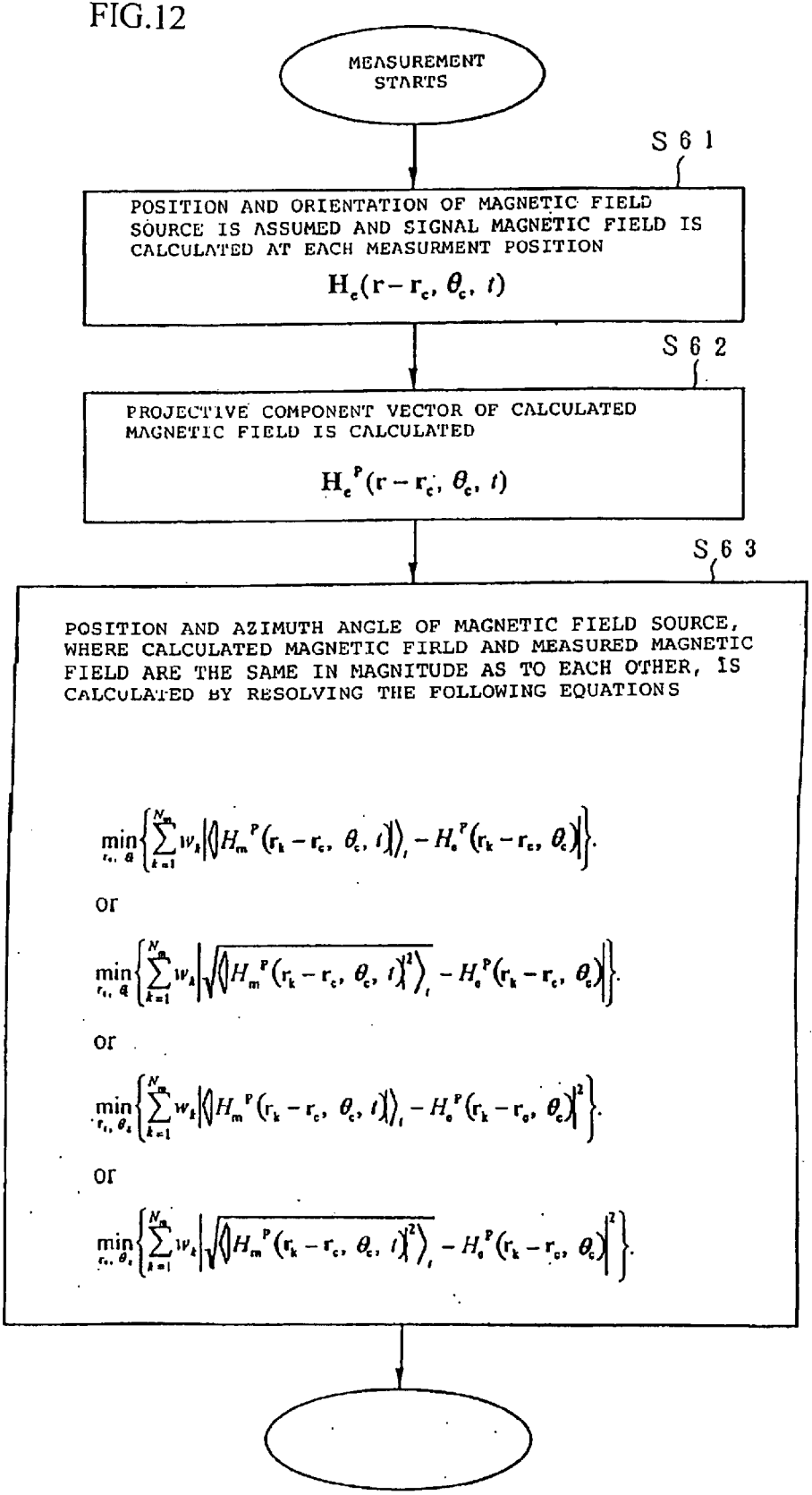
FIG. 12 is a flowchart showing the procedure for calculating the position of a signal magnetic field source according to the method of the present invention where there are two noise magnetic field sources and where the number of equations is greater than the number of unknowns.

Because a greater number of independent measurands than the number of unknowns can be obtained (S61, S62), as seen in FIG. 12, when the magnetic field is measured at $N_m(>N_U)$ different places more than $N_U$ in excess of the number $N_U$ of unknowns, the position $r_c(e, y, z)$ and the angle of orientation $\theta_z$ are calculated, yielding $$\min_{r_e, \theta_c}\left\{\sum_{k=1}^{N_m} w_k |\langle |H_m^P(r_k - r_c, \theta_c, t)|\rangle_t - H_e^P(r_k - r_c, \theta_c)|\right\}. \quad (19)$$

where $<.>_t$ represents the time average and $$\min_{r_c, \theta_x}\{\ .\}$$

means that vectors $r_c$ and $\theta_c$ are changed to obtain an $r_c$ and a $\theta_c$ that minimize the contents in $\{.\}$. The symbol $w_{k,q}$ indicates weighting. Eq. (19) can be replaced with the following equations (S63).

$$\min_{r_e, \theta_c}\left\{\sum_{k=1}^{N_m} w_k \left|\sqrt{\langle |H_m^P(r_k - r_c, \theta_c, t)|^2\rangle_t} - H_e^P(r_k - r_c, \theta_c)\right|\right\}. \quad (20)$$

$$\min_{r_e, \theta_c}\left\{\sum_{k=1}^{N_m} w_k |\langle |H_m^P(r_k - r_c, \theta_c, t)|\rangle_t - H_e^P(r_k - r_c, \theta_c)|^2\right\}. \quad (21)$$

$$\min_{r_e, \theta_c}\left\{\sum_{k=1}^{N_m} w_k \left|\sqrt{\langle |H_m^P(r_k - r_c, \theta_c, t)|^2\rangle_t} - H_e^P(r_k - r_c, \theta_c)\right|^2\right\}. \quad (22)$$

Here it is assumed that $r_c$ and $\theta_c$ in Eqs. (19), (20), (21) and (22) have the same meaning as in Eq. (16).

In the above analysis, it does not matter whether the measured magnetic field vector $H_m(r-r_c, \theta_c, t)$ is a signal that has passed through a band pass filter that permits the passage of only those components close to the frequency of the signal magnetic field, or a wide-band signal that cannot pass through the band pass filter. However, the use of the signal that has passed through the band pass filter increases the likelihood of determining the position of the magnetic field with a great deal of reliability.

Further, in a situation where the signal magnetic field component is obtained by synchronous detection, the direction of the noise magnetic field is determined and is used to obtain the projective magnetic field. The subsequent processing is characteristic of the situations of both one and two noise magnetic fields. The projective component vectors $H_m^P(r-r_c, \theta_c, t)$ at their respective places are calculated from the magnetic field vectors $H_m(r-r_c, \theta_c, t)$ measured at $N_U/3$ or more different places, and a proper one of the calculated vectors is used as a reference signal to perform the synchronous detection of the measured magnetic field vectors $H_m(r-r_c, \theta_c, t)$. Thus, the magnitude $H_s(r-r_c, \theta_c)$ of the original signal magnetic field component is obtained. By determining the position vector $r_c$ and the angle-of-orientation vector $\theta_c$ of the magnetic field source so that the magnitude of the original signal magnetic field component and the magnitude $H_c(r-r_c, \theta_c)$ of the theoretical signal component are equal to each other, it is possible to detect the position and orientation of the magnetic field source.

When the number $N_U (\geq 1)$ of unknowns is a multiple of 3, the number of unknowns and the number of independent measurands can be made to be equal to each other; if the magnetic field vector $H_m(r-r_c, \theta_c, t)$ is measured at positions $N_m=N_m/N_U/3$, $N_U$ number of such equations, as given below, needs only to be solved.

$$H_s(r_k-r_c, \theta_c)-H_c(r_k-r_c, \theta_c)=0, k=1, \ldots, N_m. \quad (23)$$

Figure 13:
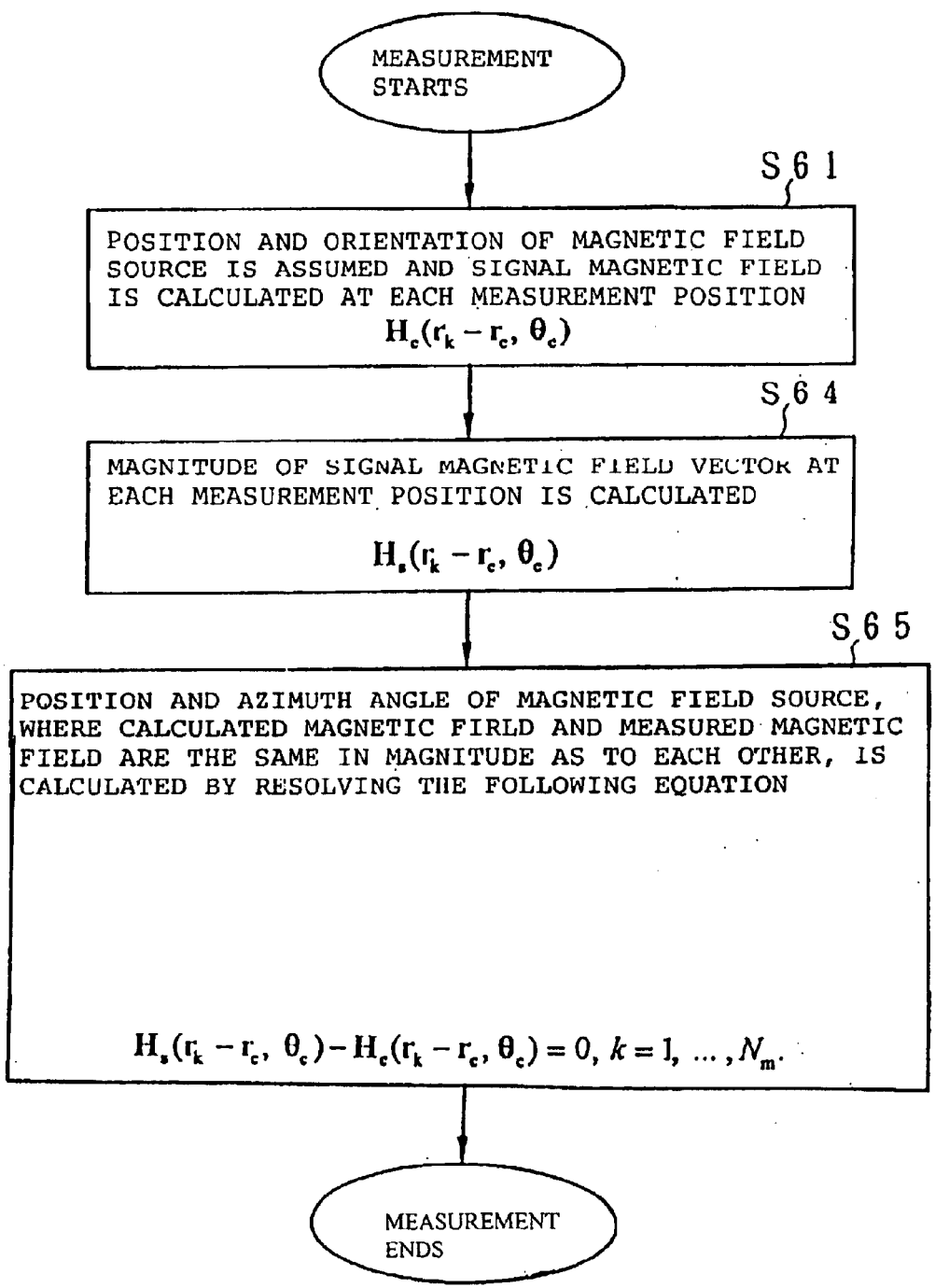
FIG. 13 is a flowchart showing an example of a procedure for obtaining a signal magnetic field by using the magnitude of the signal magnetic field vector.

FIG. 13 shows the flow of this process (S61, S62, S65). Here, $H_s(r-r_c, \theta_c)$ and $H_c(r-r_c, \theta_c, t)$ are the signal magnetic field calculated from the measured magnetic field vectors $H_m(r-r_c, \theta_c, t)$ and the magnitude of the theoretical calculated magnetic field vector, respectively. The magnitude $H_s(r-r_c, \theta_c)$ of the signal magnetic field vector is an averaged quantity, as already explained. It is assumed that the vector $\theta_c$ represents any one of $\theta_x, \theta_y, \theta_z, (\theta_y, \theta_z), (\theta_z, \theta_x), (\theta_x, \theta_y), (\theta_x, \theta_y, \theta_z)$ and $\phi$, and that the vector $r_c$ represents any one of x, y, z, (y, z), (z, x), (x, y), (x, y, z) and $\phi$, where $\phi$ represents an empty set.

For example, when the position vector $r_c(x, y, z)$ of the magnetic field source is an unknown, the magnetic field is to be measured at one place and three such equations (as given below) are solved, by which it is possible to obtain the position vector $r_c(x, y, z)$ and the azimuth angle $\theta_z$, of the magnetic field source.

$$H_s(r-r_c)-H_c(r-r_c)=0. \quad (24)$$

The vector r is the vector of the position of measurement.

Because a larger number of independent measurands than the number of unknowns can be obtained when the magnetic field is measured at $N_m(>N_U/2)$ different places more than $N_U$ in excess of the number $N_U$ of unknowns, the position $r_c(e, y, z)$ and the angle of orientation $\theta_z$ are calculated, yielding $$\min_{r_c, \theta_c}\left\{\sum_{k=1}^{N_m} w_k |H_s(r_k - r_c, \theta_c) - H_c(r_k - r_c, \theta_c)|\right\}. \quad (25)$$

where $$\min_{r_c, \theta_x}\{\ .\}$$

means that vectors $r_c$ and $\theta_c$ are changed to obtain the vectors $r_c$ and $\theta_c$ that minimize the contents in $\{.\}$. Further, the symbol $w_{k,q}$ indicates weighting. Eq. (25) can be replaced with the following equations.

$$\min_{r_c, \theta_c}\left\{\sum_{k=1}^{N_m} w_k (\|H_s(r_k - r_c, \theta_c)\| - \|H_c(r_k - r_c, \theta_c)\|)^2\right\}. \quad (26)$$

$$\min_{r_c, \theta_c}\left\{\sum_{k=1}^{N_m} w_k |H_s(r_k - r_c, \theta_c) - H_c(r_k - r_c, \theta_c)|^2\right\}. \quad (27)$$

Figure 14:
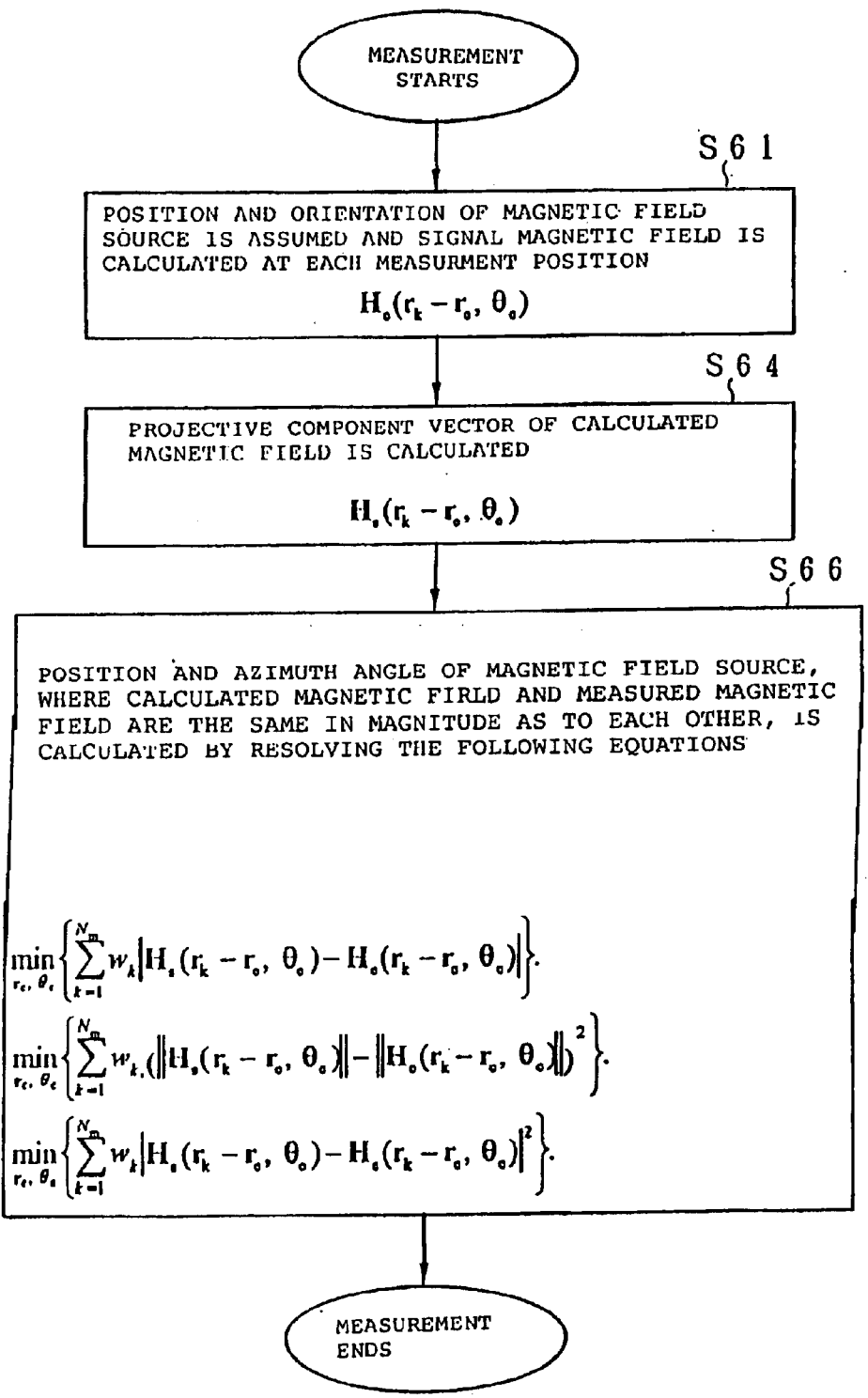
FIG. 14 is a flowchart showing another example of a procedure for obtaining a signal magnetic field by using the magnitude of the signal magnetic field vector.

FIG. 14 shows the flow of this process (S61, S64, S66).

Determining the Direction of the Noise Magnetic Field

With virtually one noise magnetic field.

Figure 15:
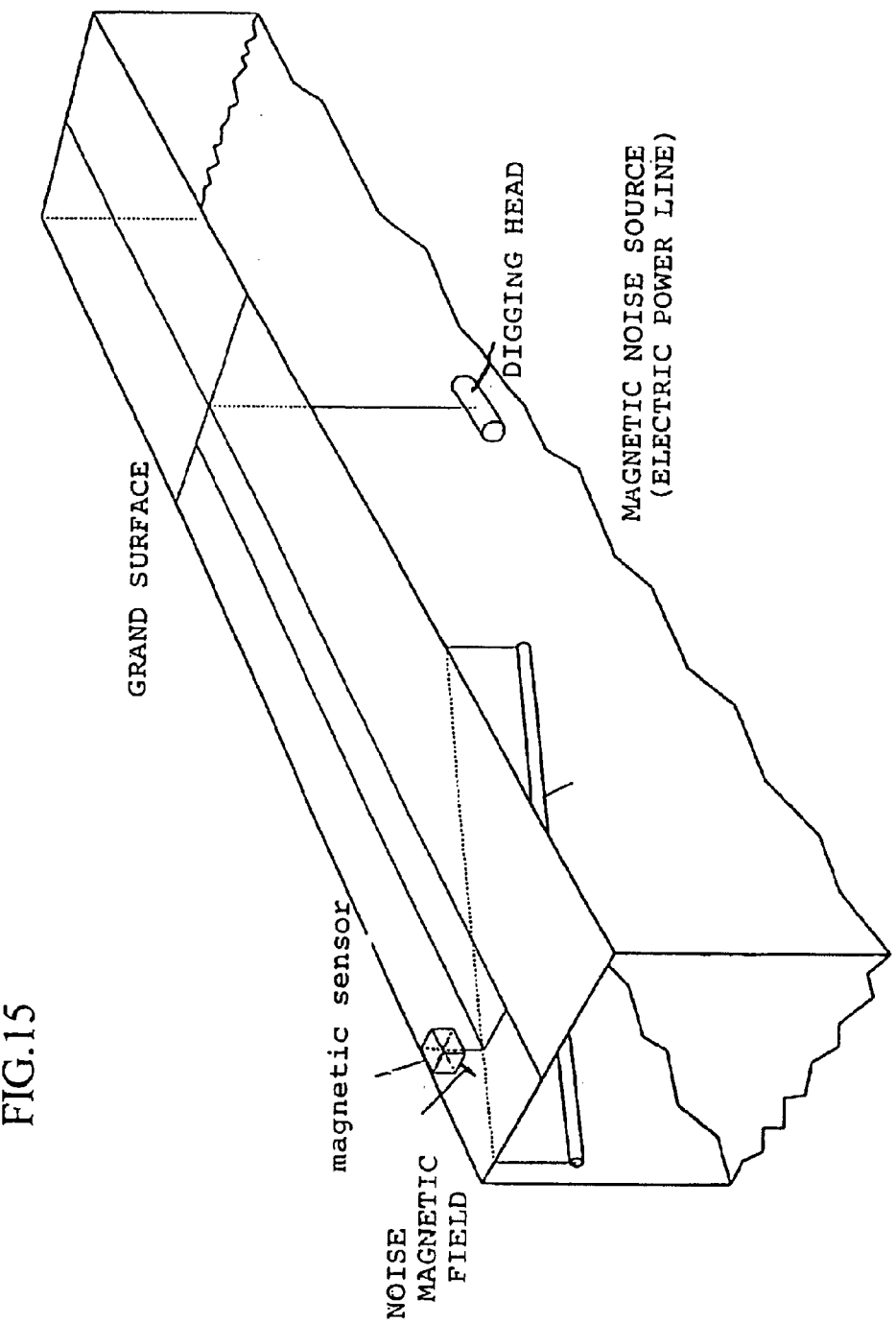
FIG. 15 is a perspective view showing the placement of a magnetic sensor for determining the direction of a noise magnetic field according to the method of the present invention when the digging head is the signal magnetic field source and is distant from the position of measurement.

Method (1). The first method for determining the direction of the noise magnetic field is used where, in a situation with no signal magnetic field, a noise magnetic field is measured using the same measuring system as for measuring the signal magnetic field. This type of situation is shown in FIG. 15, where the detection of the digging position is disturbed by a noise magnetic field source lying in the vicinity of the digging route. Another situation is where the signal magnetic field source is able to receive a command sent, for example, from the ground by some means and is responsive to the command to stop generating the signal magnetic field.

Figure 16:
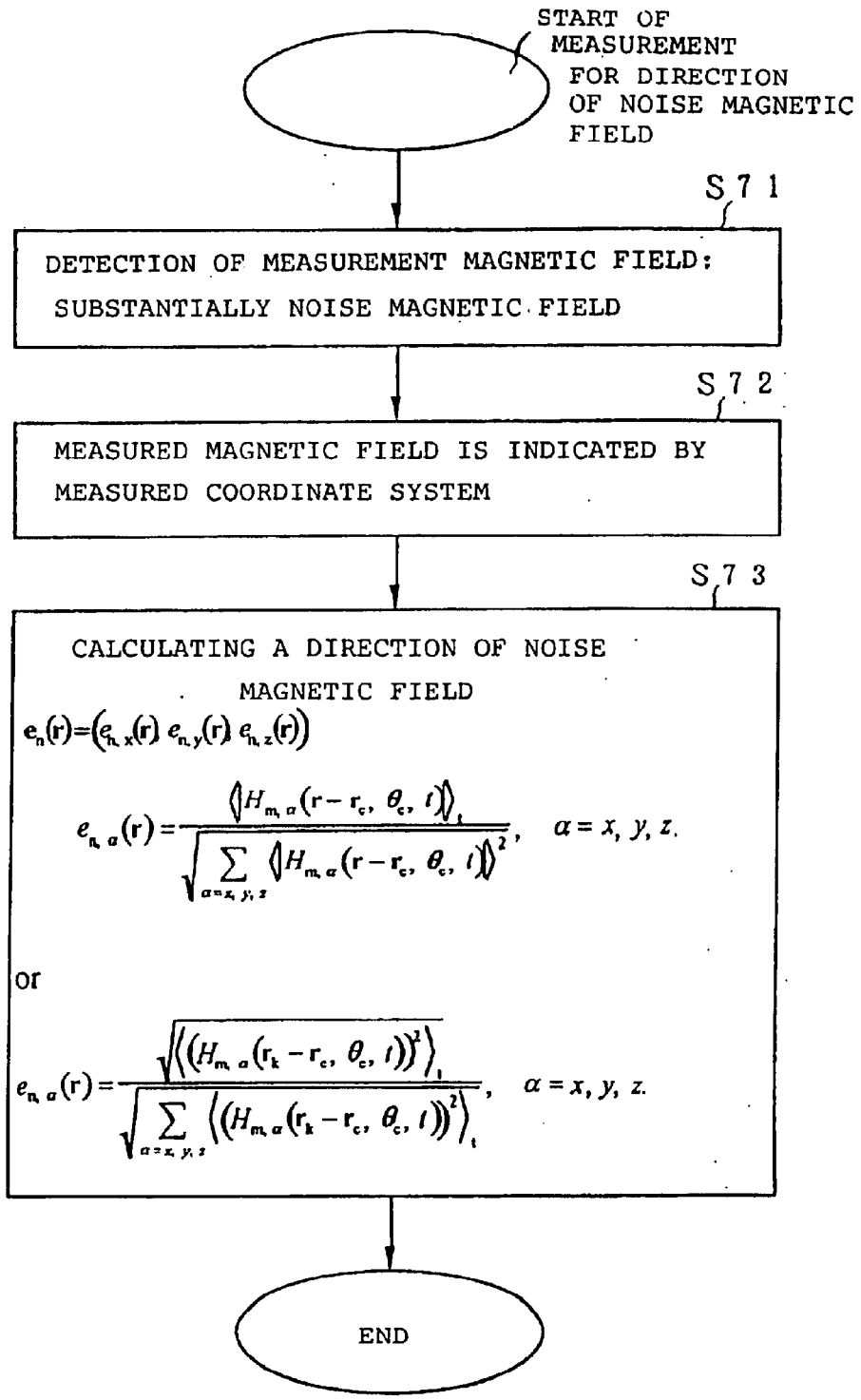
FIG. 16 is a flowchart showing a procedure for calculating the direction of a noise magnetic field according to the method of the present invention where the digging head is distant from the position of measurement and the signal magnetic field source stops to generate the magnetic field.

In this instance, as depicted in FIG. 16, if the measured magnetic field is represented by a vector $H_m(r-r_c, \theta_c, t)$, because this is essentially a noise magnetic field vector $H_n(r, t)$ as shown at a step (S71), an average value of its absolute values can be used (S72) to calculate the direction vector, $e_n(r)=e_{n,x}(r), e_{n,y}(r), e_{n,z}(r))$, of the noise magnetic field as follows:

$$e_{n,\alpha}(r) = \frac{\langle |H_{m,\alpha}(r-r_c, \theta_c, t)|\rangle_t}{\sqrt{\sum_{\alpha=x,y,z} \langle |H_{m,\alpha}(r-r_c, \theta_c, t)|\rangle^2}}, \alpha = x, y, z. \quad (28)$$

Alternatively, a root-mean-square value of the above absolute values can be used to determine the direction of the noise magnetic field by use of the equation $$e_{n,\alpha}(r) = \frac{\sqrt{\langle (H_{m,\alpha}(r_k-r_c, \theta_c, t))^2\rangle_t}}{\sqrt{\sum_{\alpha=x,y,z} \langle (H_{m,\alpha}(r_k-r_c, \theta_c, t))^2\rangle_t}}, \alpha = x, y, z. \quad (29)$$

In this case, the symbol $H_{m,\alpha}(r-r_c, \theta_c, t)$ is an $\alpha$ component of the measured magnetic field (the noise magnetic field), and $\alpha$ is any one of x, y and z.

In the analysis above, it does not matter whether the measured magnetic field vector $H_m(r-r_c, \theta_c, t)$ is a signal that has passed through a band pass filter that permits the passage of only those components close to the frequency of the signal magnetic field, or a wide-band signal that cannot pass through the band pass filter. However, the use of the signal that has passed through the band pass filter increases the likelihood of determining the position of the magnetic field with a great deal of reliability.

Method (2).

Step 1

Figure 17:
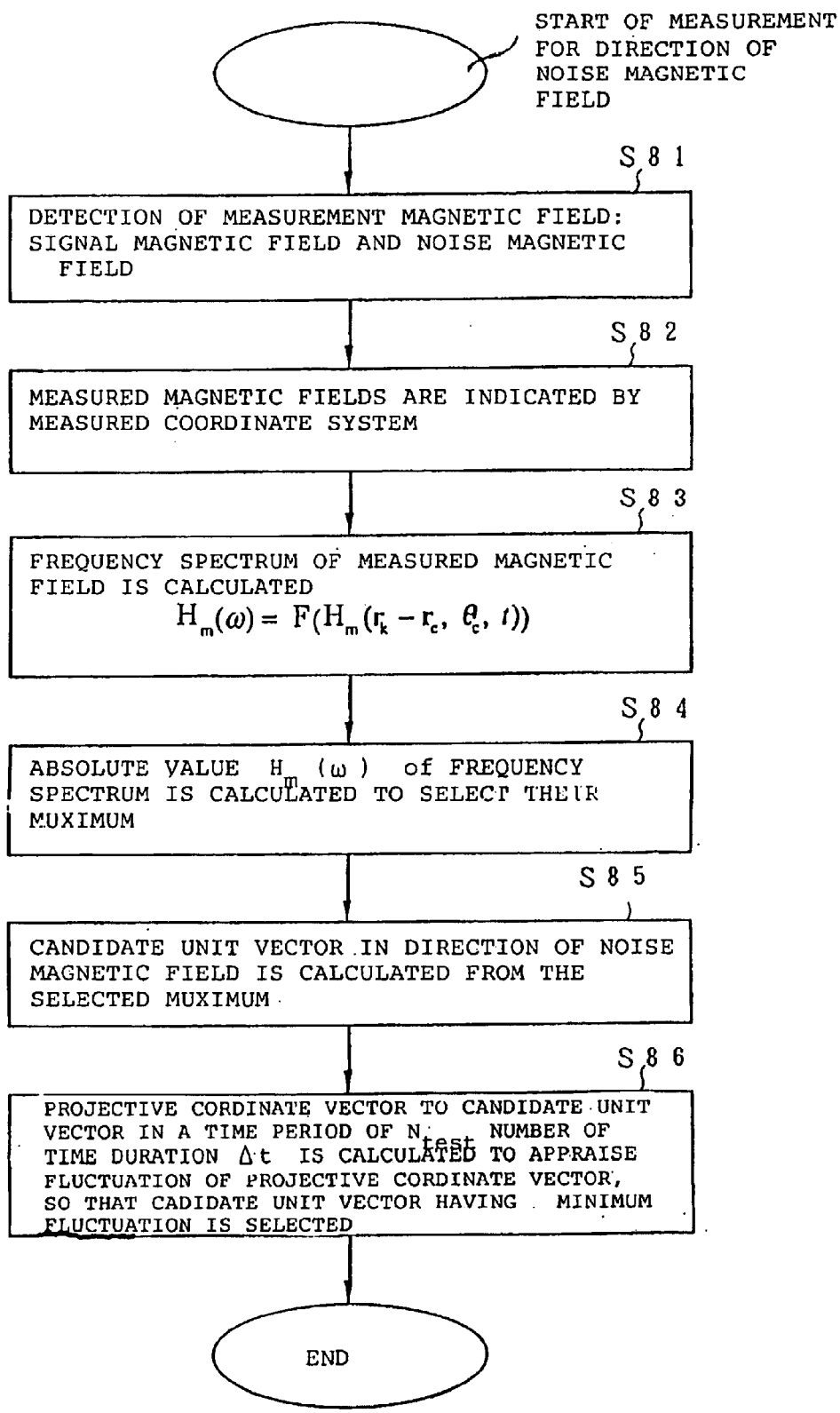
FIG. 17 is a flowchart showing a procedure for calculating the direction of a noise magnetic field according to the method of the present invention when the signal magnetic field and the noise magnetic field mix with each other.

Turning now to FIG. 17, at first the frequency spectrum $H_m(\omega)$ of the measured magnetic field vector $H_m(r-r_c, \theta_c, t)$ is calculated (S81, S82, S83) by means of the following equation.

$$H_m(\omega)=F(H_m(r_k-r_c, \theta_c, t)) \quad (30)$$

In this case, the symbol $F(.)$ represents a Fourier transform; the three components x, y and z of the measured magnetic field vector $H_m(r-r_c, \theta_c, t)$ are each Fourier transformed. In practice, the above-mentioned frequency spectrum can be calculated by FFT (fast Fourier transform) or the like of sampled values of the measured magnetic field vector $H_m(r-r_c, \theta_c, t)$.

Step 2

Next, an angular frequency $\omega_i$, where i=1, 2, ..., $N_s$, of a large-amplitude component, such as a line spectrum, is selected (S84) from the absolute value $|H_m(\omega)|$ of the frequency spectrum. For the component of each angular frequency $\omega_i$, where i=1, 2, ..., $_{Nns}$, a candidate unit vector $e_n(r, \omega_i)$, where i=1, 2, ..., $N_{ns}$, of the direction of the noise magnetic field, is calculated (S85) by either method (1) or (2) below.

(1) The absolute values of the Fourier-transformed x, y, and z components of the angular frequency concerned are used to calculate the candidate unit vector $e_n(r, \omega_i)$, where i=1, 2, ..., $N_{ns}$, of the direction of the noise magnetic field, by the following procedures:

(2)

$$e_n(r, \omega_i) = \frac{(|H_{m,x}(\omega_i)||H_{m,x}(\omega_i)||H_{m,x}(\omega_i)|)}{\sqrt{\sum_{\alpha=x,y,z}|H_{m,\alpha}(\omega_i)|^2}}, i=1, \ldots, N_{ns}. \quad (31)$$

where $H_{m,\alpha}(\omega_i)$, $\alpha$=x, y, z and i=1, 2, ..., $N_{ns}$, is a $\omega_i$ component by the Fourier transform of the $\alpha$ component of the measured magnetic field.

(3) A narrow-band filter is formed the pass band of which uses, as the center frequency, the angular frequency $\omega_i$, where i=1, 2, ..., $_{Nns}$, and the method of Eq. (21) or (22) is used to calculate the candidate unit vector $e_n(r, \omega_i)$, where i=1, 2, ..., $N_{ns}$. That is, the candidate unit vector $e_n(r, \omega_i)=(e_{n,x}(r), e_{n,y}(r), e_{n,z}Z(r))$, where i=1, 2, ..., $N_{ns}$, is calculated by $$e_{n,\alpha}(r, \omega_i) = \frac{\langle |H_{m,\alpha}(r-r_c, \theta_c, \omega_i, t)|\rangle_t}{\sqrt{\sum_{\alpha=x,y,z} \langle |H_{m,\alpha}(r-r_c, \theta_c, \omega_i t)|\rangle^2}}, \quad (32)$$

$\alpha = x, y, z; i=1, \ldots, N_{ns}$.

or by $$e_{n,\alpha}(r, \omega_i) = \frac{\sqrt{\langle (H_{m,x}(r_k-r_c, \theta_c, \omega_i, t))^2\rangle_t}}{\sqrt{\sum_{\alpha=x,y,z} \langle (H_{m,\alpha}(r_k-r_c, \theta_c, \omega_i, t))^2\rangle_t}}, \quad (33)$$

$\alpha = x, y, z; i=1, \ldots, N_{ns}$.

Step 3

The candidate unit vector $e_n(r, \omega_i)=(e_{n,x}(r), e_{n,y}(r), e_{n,z}(r))$, where i=1, 2, ..., $N_{ns}$, is considered as the direction vector $e_n(r)$ of the noise magnetic field, and for each angular frequency $\omega_i$, where i=1, 2, ..., $N_{ns}$, the method of Eq. (1) is used to calculate a projective component vector $H_m^P(r-r_c, \theta_c, \omega_i, t)$.

$$H_m^P(r-r_c, \theta_c, \omega_i, t)=H_m(r-r_c, \theta_c, t)-(H_m(r-r_c, \theta_c, t) \cdot e_n(r, \omega_i))e_n(r, \omega_i), i=1, \ldots, N_{ns}. \quad (34)$$

The angular frequency $\omega_i$ is contained as a variable of the projective component so as to explicitly point out that the projective component is dependent on the angular frequency $\omega_i$, where i=1, 2, ..., $N_{ns}$. A roper time interval $T_{test}$, which consists of $N_{test}$ durations $T_{t,k}$, where k=1, 2, ..., $N_{test}$, each having a short time length $\Delta t$, is chosen, and the variation of the projective component vector $H_m^P(r-r_c, \theta_c, \omega_i, t)$ for each duration $T_{t,k}$, where k=1, 2, ..., $N_{test}$, is evaluated (S86). It is assumed, here, that each duration $T_{t,k}$, where k=1, 2, ..., $N_{test}$, does not overlap other durations. More concretely, a variation of $N_{test}$ statistics $v_{eval,k}(\omega_i)$ of the $N_{test}$, where k=1, ..., $N_{test}$, which are determined by any one of the methods described below, is calculated.

(1) One or both of the means of absolute values of two orthogonal components by $$v_{eval,k}(\omega_i)=<|H_{m,q}^P(r-r_c, \theta_c, \omega_i, t)|>_{T_{t,k}}, q=1, 2; k=1, \ldots, N_{test}; i=1, \ldots, N_{ns}. \quad (35)$$

where $<.>_{T_{t,k}}$ represents the mean value in the duration $T_{t,k}$ and $v_{eval,k}$ is a statistic calculated for the duration $T_{t,k}$.

(2) Mean of absolute values $$v_{eval,k}(\omega_i) = <|H_m^P(r-r_c, \theta_c, \omega_i, t)|>_{T_{i,k}}, k=1, \ldots, N_{test}; i=1, \ldots, N_{ns}. \quad (36)$$

(3) One or both of the means of squares of two orthogonal components by $$v_{eval,k}(\omega_i) = <(H_{m,q}^P(r-r_c, \theta_c, \omega_i, t))^2>_{T_{i,k}}, q=1, 2; k=1, \ldots, N_{test}; i=1, \ldots, N_{ns}. \quad (37)$$

(4) One or both of square roots of the means of squares of two orthogonal components by $$v_{eval,k}(\omega_i) = \sqrt{\langle(H_{m,q}^P(r-r_c, \theta_c, \omega_i, t))^2\rangle_{T_{t,k}}}, \quad (38)$$

$$q = 1, 2; k = 1, \ldots, N_{test}; i = 1, \ldots, N_{ns}.$$

For the statistics $v_{eval,k}$, where $k=1, \ldots, N_{test}$ calculated by these equations, the following equation is applied to obtain (S86) a value of $\omega_{i,min}$ that is the angular frequency $\omega_i$ that minimizes $\text{var}(\omega_i)$:

$$\text{var}(\omega_i) = \frac{\sqrt{mean_k((v_{eval,k}(\omega_i) - mean_k(v_{eval,k}(\omega_i)))^2}}{mean_k(v_{eval,k}(\omega_i))}, \quad (39)$$

$$i = 1, \ldots, N_{ns}.$$

In the above, $mean_k(.)$ indicates averaging for the suffix k, that is, $$mean_k(.) = \frac{\sum_{k=1}^{N_{test}}(.)}{N_{test}}. \quad (40)$$

The magnetic field of the angular frequency $\omega_{i,min}$ derives from the noise magnetic field, and the direction of the noise magnetic field becomes a vector $e_n(r, \omega_{i,min})$.

It should be noted that the angular frequency $\omega_{i,min}$, which minimizes $\text{var}(\omega_i)$, needs only to be measured at one place and need not be obtained at every place where to measure the magnetic field.

With this method, it is also possible to calculate a fluctuation in the direction of a vector $H_m^P(r-r_c, \theta_c, \omega_i, t)$, as well as an amplitude fluctuation given by Eq. (39), and to select the angular frequency $\omega_{i,min}$ at which the direction fluctuation becomes minimal, or smaller than a predetermined value. In the above description, the measured magnetic field vector $H_m(r-r_c, \theta_c, t)$ in Step 1 is a wide-band signal, and in Step 3 it does not matter whether the measured magnetic field vector $H_m(r-r_c, \theta_c, t)$ is a signal that has passed through a band pass filter that permits the passage of only those components close to the frequency of the signal magnetic field or a wide-band signal that cannot pass through the band pass filter. However, the use of the signal that has passed through the band pass filter increases the likelihood of determining the position of the magnetic field with a high degree of reliability.

Figure 18:
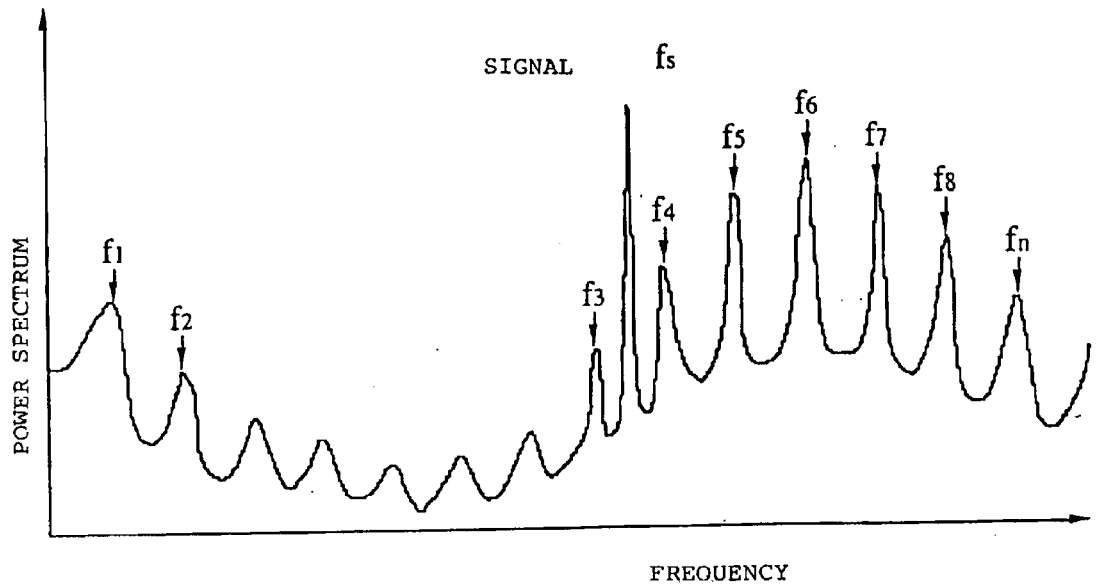
FIG. 18 is a signal frequency spectrum diagram showing how the selection of a frequency for maximizing a frequency spectrum is used in the process for calculating the direction of the noise magnetic field in the flowchart as shown in FIG. 13.
Figure 19:
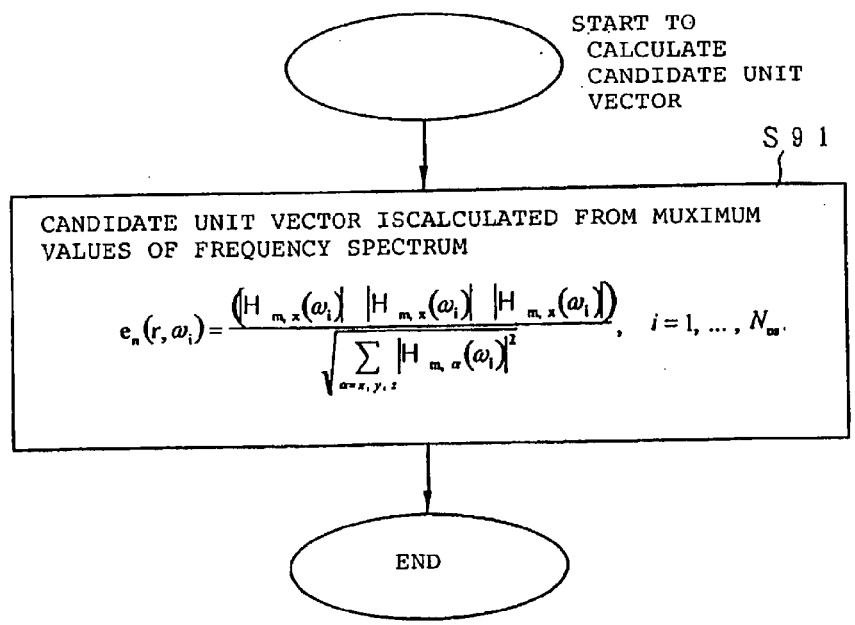
FIG. 19 is a flowchart showing a first method for using the flow of candidate vector calculating process in the process of calculating the direction of the noise magnetic field in the flowchart as shown in FIG. 17.
Figure 20:
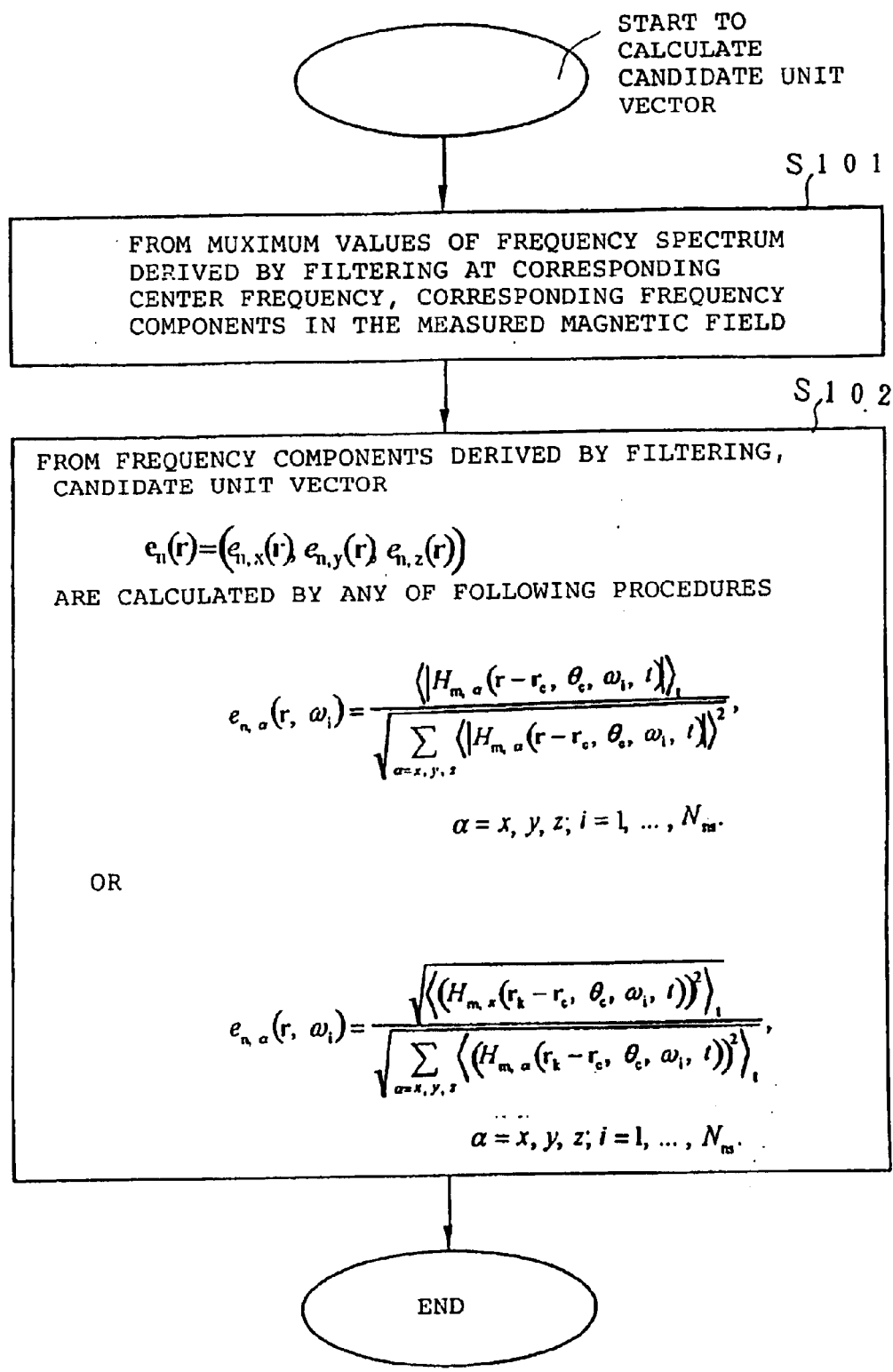
FIG. 20 is a flowchart showing a second method for using the flow of candidate vector calculating process in the process of calculating the direction of the noise magnetic field in the flowchart as shown in FIG. 17.
Figure 21:
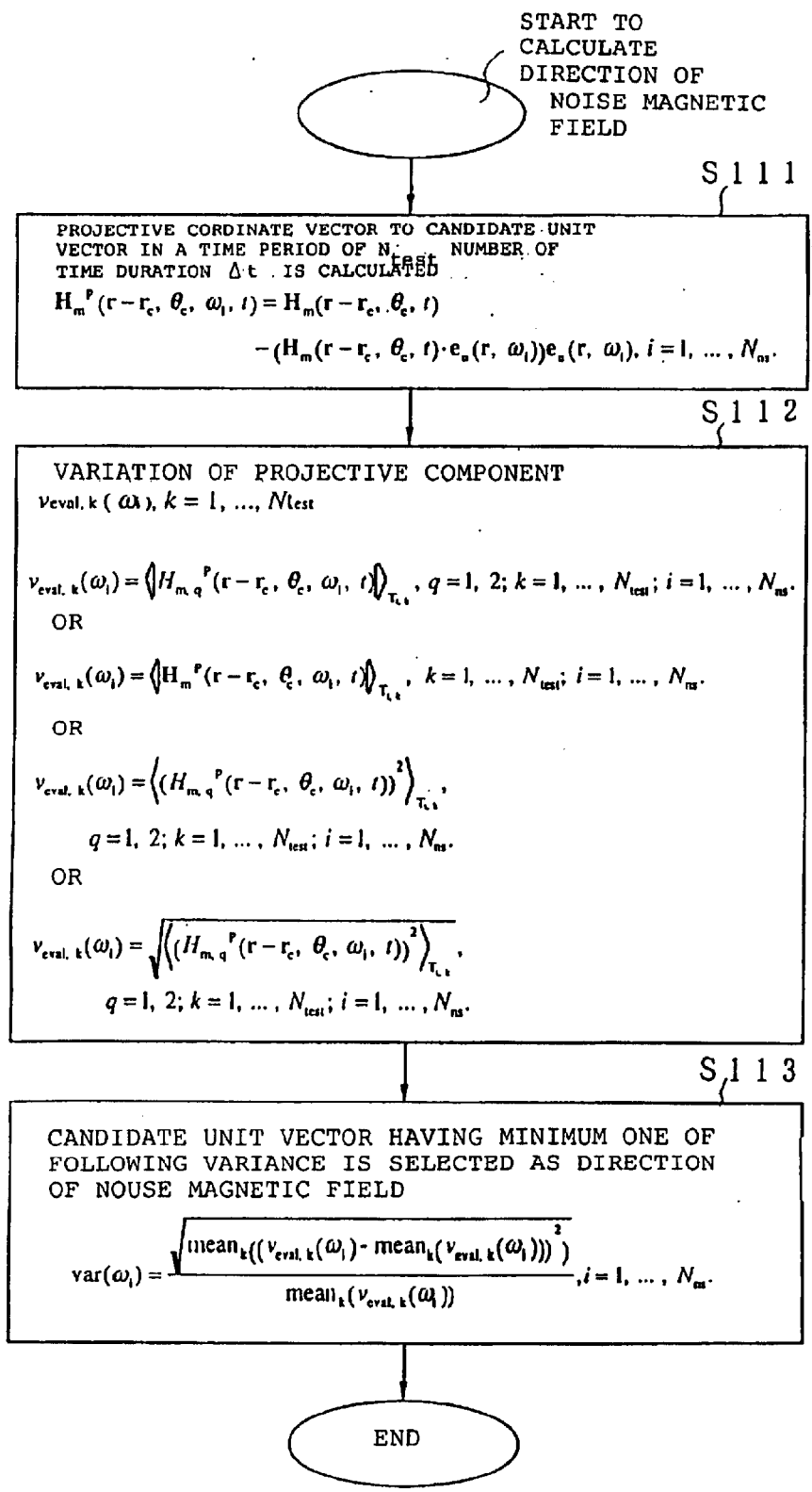
FIG. 21 is a flowchart showing a method for using the flow of process of evaluating the candidate vector and obtaining the direction of the noise magnetic field in the process of calculating the direction of the noise magnetic field in the flowchart as shown in FIG. 17.

FIG. 18 shows how to select the frequencies $f_1(=\omega_1/2\pi)$, $f_2(=\omega_2/2\pi), \ldots, f_n(=\omega_n/2\pi$, where $n=N_{ns})$, at which the frequency spectrum becomes maximum; FIG. 19 shows the flow of the process, including step S91, for obtaining the candidate vector; and FIGS. 20 and 21 show the flow of the process, including steps S101 and S102 or steps S1 and S112, for evaluating the candidate vector and for detecting the direction of the noise magnetic field.

The frequency spectrum $H_m(\omega)$ need not always be used. That is, the signal magnetic field is periodically turned OFF/ON after a predetermined procedure; the period $T_{period}$ is divided into equally spaced durations; the candidate unit vector $e_n(r, t_i)$, where $i=1, \ldots, N_{ns}$, is used in place of the candidate unit vector $e_n(r, \omega_i)$, where $i=1, \ldots, N_{ns}$, which is calculated by Eqs. (25), (26) and (27); and, thereafter, the duration that minimized the variation by Eq. (33) is calculated by the process described above. In this way, the vector $e_n(r, t_i)$ in that duration can be adopted as the direction of the noise magnetic field.

Method (3). In the second method, the large-amplitude angular frequency $\omega_i$, where $i=1, 2, \ldots, N_s$, is selected from the absolute value $|H_m(\omega)|$ of the frequency spectrum $H_m(\omega)$. However, the vector $e_n(r, \omega_{i,min})$ can be obtained as the direction of the noise magnetic field in exactly the same manner as in the case of the second method, by selecting a proper frequency band near the frequency of the signal magnetic field, setting properly spaced test frequencies free from the frequency of the signal magnetic field in the frequency band and regarding the test frequencies as the angular frequency $\omega_i$, as in the second method.

As is the case with the second method, the angular frequency $\omega_{i,min}$ at which $\text{var}(\omega_i)$ becomes minimum needs only to be obtained.

Figure 22:
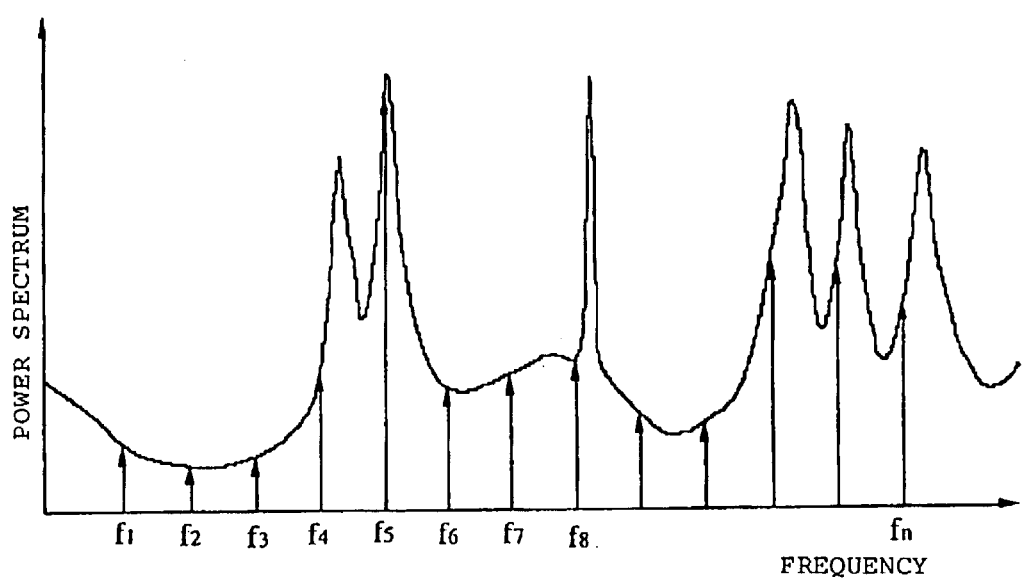
FIG. 22 is a signal frequency spectrum diagram showing how the selection of a frequency for maximizing a frequency spectrum is used in the process of calculating the direction of the noise magnetic field in the flowchart as shown in FIG. 13.

FIG. 22 shows how to select the frequencies $f_1(=\omega_1/2\pi)$, $f_2(=\omega_2/2\pi), \ldots, f_n(=\omega_n/2\pi$, where $n=N_{ns})$ at which the frequency spectrum is maximized. The flow of the subsequent process is the same as depicted in FIGS. 17, 19 and 20.

Figure 23:
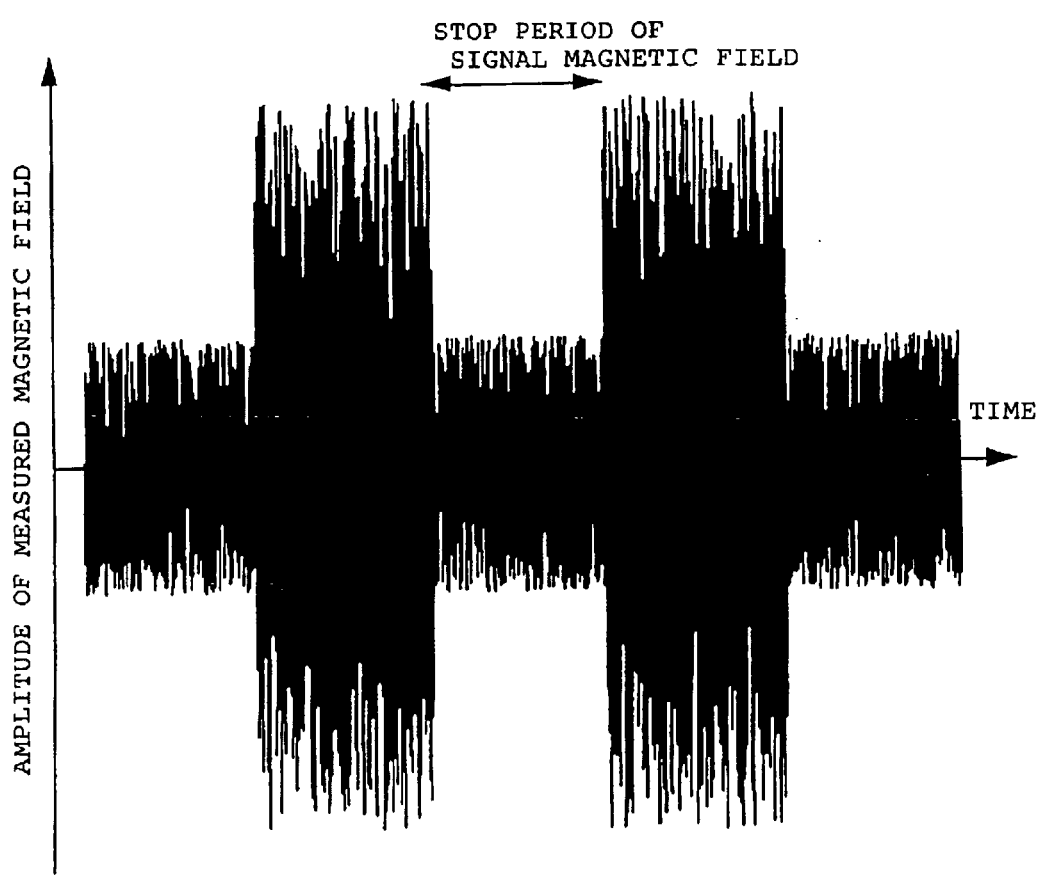
FIG. 23 is a signal waveform diagram showing the role of specifying a period in which only one noise magnetic field exists by using the fact that the amplitude of the sensed magnetic field signal diminishes during the OFF period of the signal magnetic field that is turned OFF by a predetermined procedure, in the process of calculating the direction of the noise magnetic field according to the method of the present invention.

Method (4). The signal magnetic field is periodically stopped under the control of a predetermined procedure. For example, the signal magnetic field is periodically stopped at a predetermined time interval. Because the intensity of the magnetic field being measured decreases while the signal magnetic field is stopped, the OFF period of the signal magnetic field is identified by interpreting the intensity-decreasing period essentially as a predetermined OFF period. The direction of the magnetic field measured during the OFF period is used as the direction of the noise magnetic field. The direction of the noise magnetic field can be obtained using the same method as the first one. FIG. 23 shows how the amplitude of the measured magnetic field in this method varies over time.

Method (5). Here, the signal magnetic field is periodically stopped after a predetermined procedure. This is cared out as described below as options (1) and (2).

(1) To stop the signal magnetic field on a rectangular-wave-wise:

The signal magnetic field is repeatedly turned ON and OFF with the period $T_{period}$, for instance.

$$s(t)=1, t_k \leq t < t_k+t_{stop}.$$
$$=-1, t_k+t_{stop} \leq t \leq t_{k+1}. \quad (41)$$

When a sequence s(t) is 1, the signal magnetic field is turned OFF, but when the sequence is −1, the signal magnetic field is turned ON. In the above, $$t_{k+1}-t_k=T_{period}, k=1, 2, 3, \quad (42)$$

(2) To stop the signal magnetic field on a pseudo-random-signal-wise basis, for example, when the value is "−1" in a random sequence like an M-sequence consisting of unit periods $T_{unit}$ of the same length $N_M$, the signal magnetic field is turned ON, but when the value is "1," the signal magnetic field is turned OFF; and this sequence is repeated. In this case, the time average of the sequence is set to 0.

Figure 24:
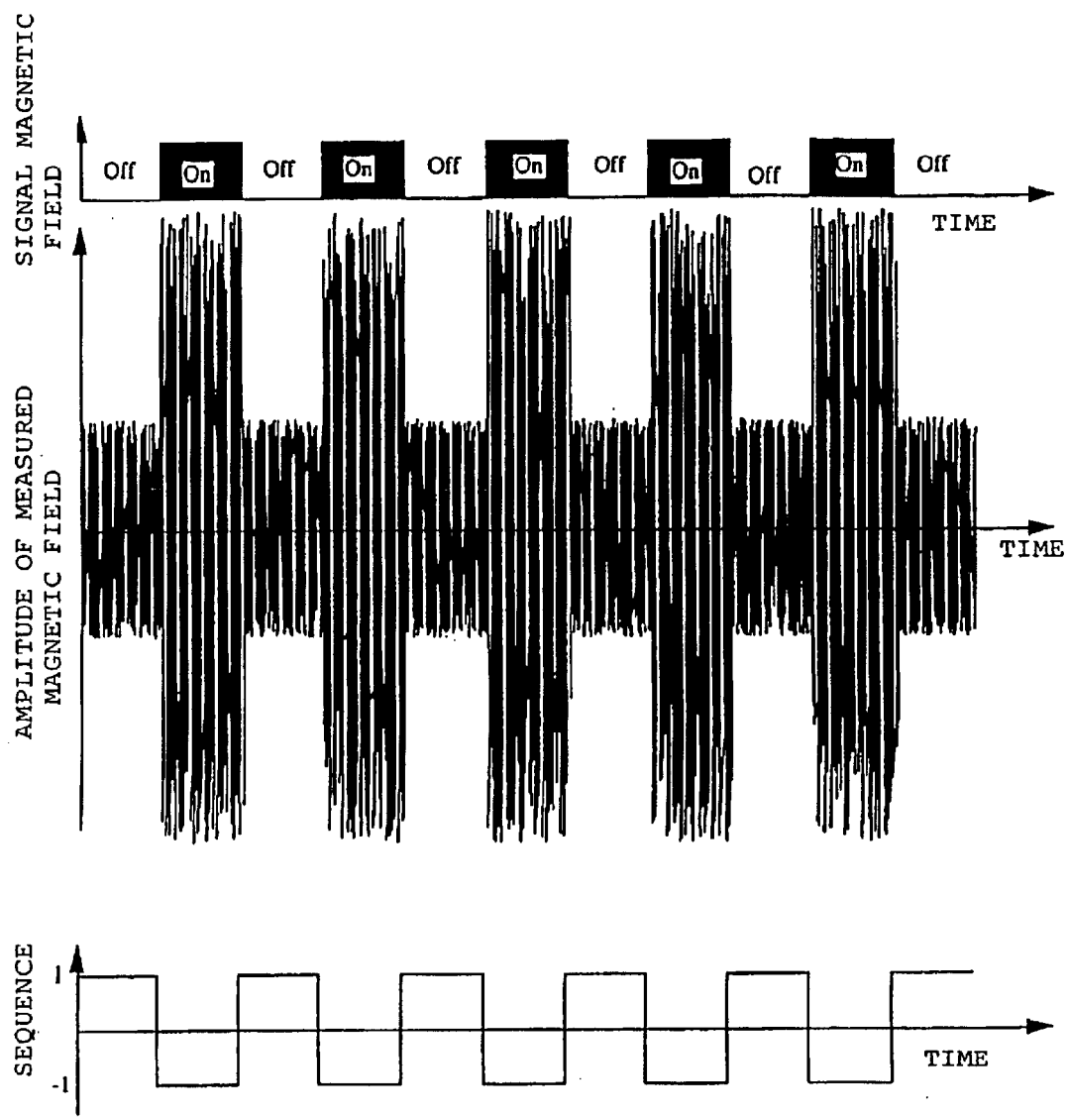
FIG. 24 is a signal waveform diagram showing the role of instantaneous variations in the amplitude of the sensed magnetic field signal when the signal magnetic field is periodically turned OFF in the calculation of the direction of the noise magnetic field according to the method of the present invention.
Figure 25:
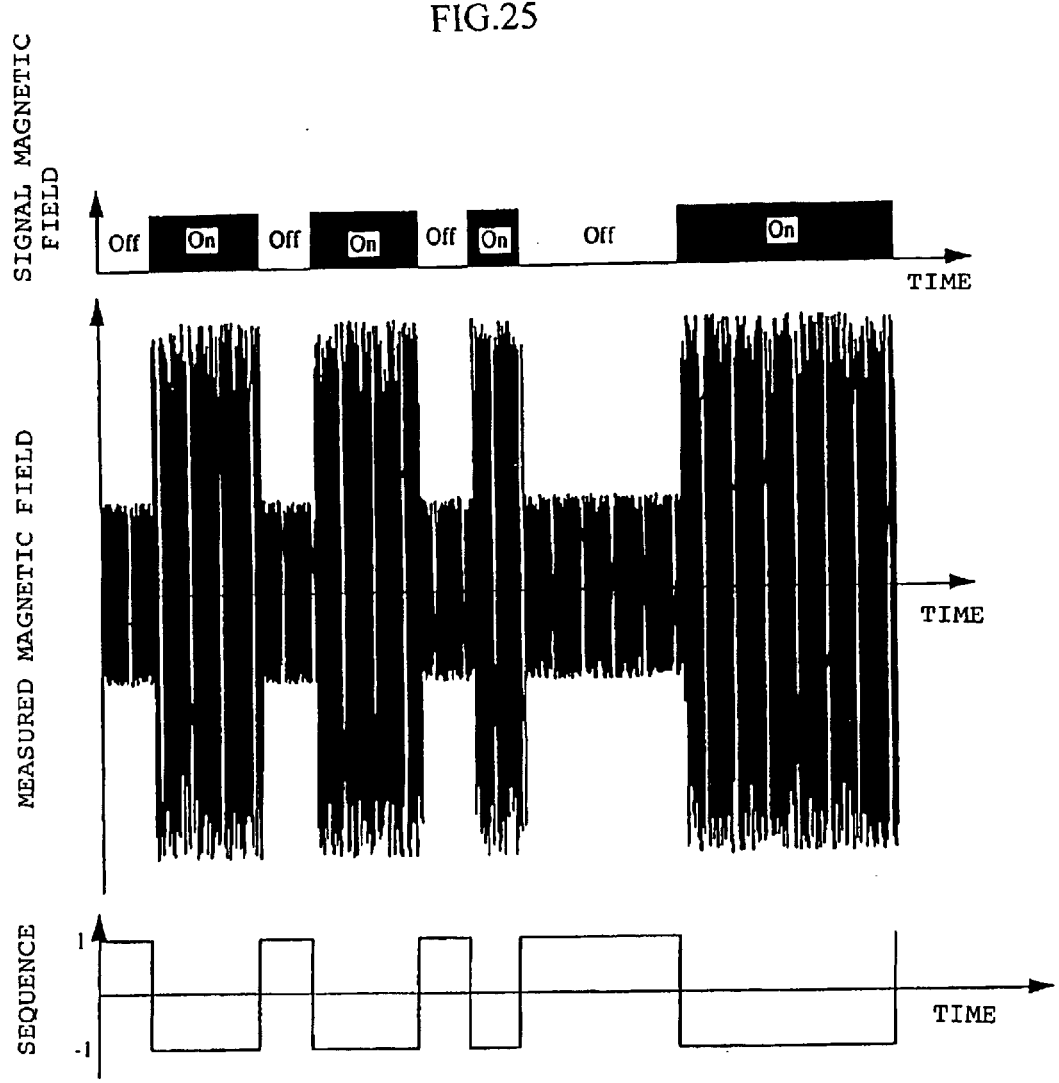
FIG. 25 is a signal waveform diagram showing the role of instantaneous variations in the amplitude of the sensed magnetic field signal when the signal magnetic field is randomly turned OFF in the calculation of the direction of the noise magnetic field according to the method of the present invention.

FIG. 24 shows, temporal variations in the amplitude of the measured magnetic field when the signal magnetic field is stopped by method (1). FIG. 25 shows temporal variations in the amplitude of the measured magnetic field when the signal magnetic field is stopped by method (2).

Figure 26:
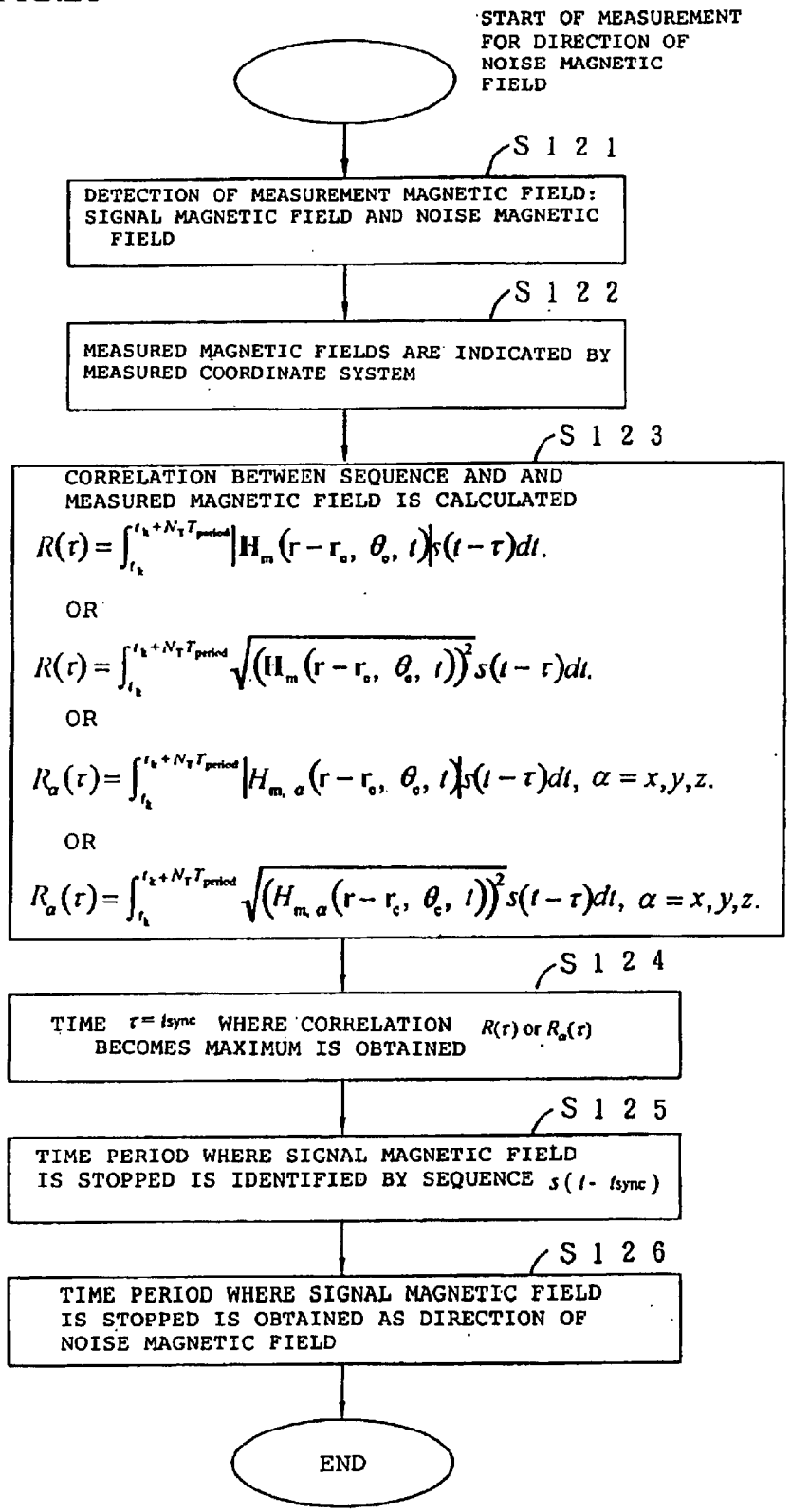
FIG. 26 is a flowchart showing a method for calculating the direction of the noise magnetic field according to the present invention in which the signal magnetic field is turned OFF on the basis of a predetermined sequence, a period during which a particular magnetic field is OFF being specified by a sequence that starts when a correlation function between the sequence and the sensed magnetic field is at its maximum, and the direction of the sensed magnetic field in the specified period is regarded as the direction of the noise magnetic field.

Next, as depicted in FIG. 26, the correlation function between the sequence s(t) and the norm of the measured magnetic field or the absolute value of its particular component is calculated (S121, S122, S123). As the correlation function, it is possible to use any one of the equations given below:

$$R(\tau) = \int_{t_k}^{t_k+N_T T_{period}} |H_m(r-r_c, \theta_c, t)|s(t-\tau)dt. \qquad (43)$$

$$R(\tau) = \int_{t_k}^{t_k+N_T T_{period}} \sqrt{(H_m(r-r_c, \theta_c, t))^2}\, s(t-\tau)dt. \qquad (44)$$

$$R_\alpha(\tau) = \int_{t_k}^{t_k+N_T T_{period}} |H_{m,\alpha}(r-r_c, \theta_c, t)|s(t-\tau)dt,\ \alpha=x,y,z. \qquad (45)$$

$$R_\alpha(\tau) = \int_{t_k}^{t_k+N_T T_{period}} \sqrt{(H_{m,\alpha}(r-r_c, \theta_c, t))^2}\, s(t-\tau)dt,\ \alpha=x,y,z. \qquad (46)$$

In this case, the period for detecting the correlation is set to an integral multiple $N_T T_{period}$ of the period $T_{period}$.

The OFF state of the signal magnetic field can be detected (S125) from the time $\tau=t_{sync}$ at which time any one of the above correlation functions is maximized (S124). That is, a sequence $s(t-t_{sync})$, which starts at the time $\tau=t_{sync}$, is used, and when the sequence s(t) is "1," the signal magnetic field is regarded as being OFF; in this way, the ON/OFF operation of the signal magnetic field is determined.

In a signal magnetic field OFF period determined in this way, the direction of the measured magnetic field is detected, and that direction is regarded as the direction of the noise magnetic field (S126). When the sequence s(t) is "−1" (a second numerical value), the signal magnetic field is turned ON, and when the sequence is "1" (a first numerical value), the signal magnetic field is turned OFF; this sequence is repeated in this way.

Method (6). As with the fifth method, the signal magnetic field is periodically stopped under control of a predetermined procedure as described below.

(1) To stop the signal magnetic field on a rectangular-wave-wise:

The signal magnetic field is repeatedly turned ON and OFF with the period $T_{period}$, for example.

$$s(t)=1,\ t_k \leq t < t_k+t_{stop}.$$
$$=-1,\ t_k+t_{stop} \leq t \leq t_{k+1}. \qquad (41)$$

When the sequence s(t) is 1, the signal magnetic field is turned OFF. When the sequence is −1, the signal magnetic field is turned ON. In the above, $$t_{k+1}-t_k=T_{period},\ k=1,2,3, \qquad (42)$$

(2) To stop the signal magnetic field on a pseudo-random-signal-wise basis:

For example, when the value is "−1" in a random sequence like an M-sequence consisting of unit periods $T_{unit}$ of the same length $N_M$, the signal magnetic field is turned ON, but when the value is "1," the signal magnetic field is turned OFF; and this sequence is repeated.

In this case, the sequence s(t) is chosen so that it changes for each predetermined time unit $\Delta t_{unit}$. The average of the sequence is "0."

Figure 27:
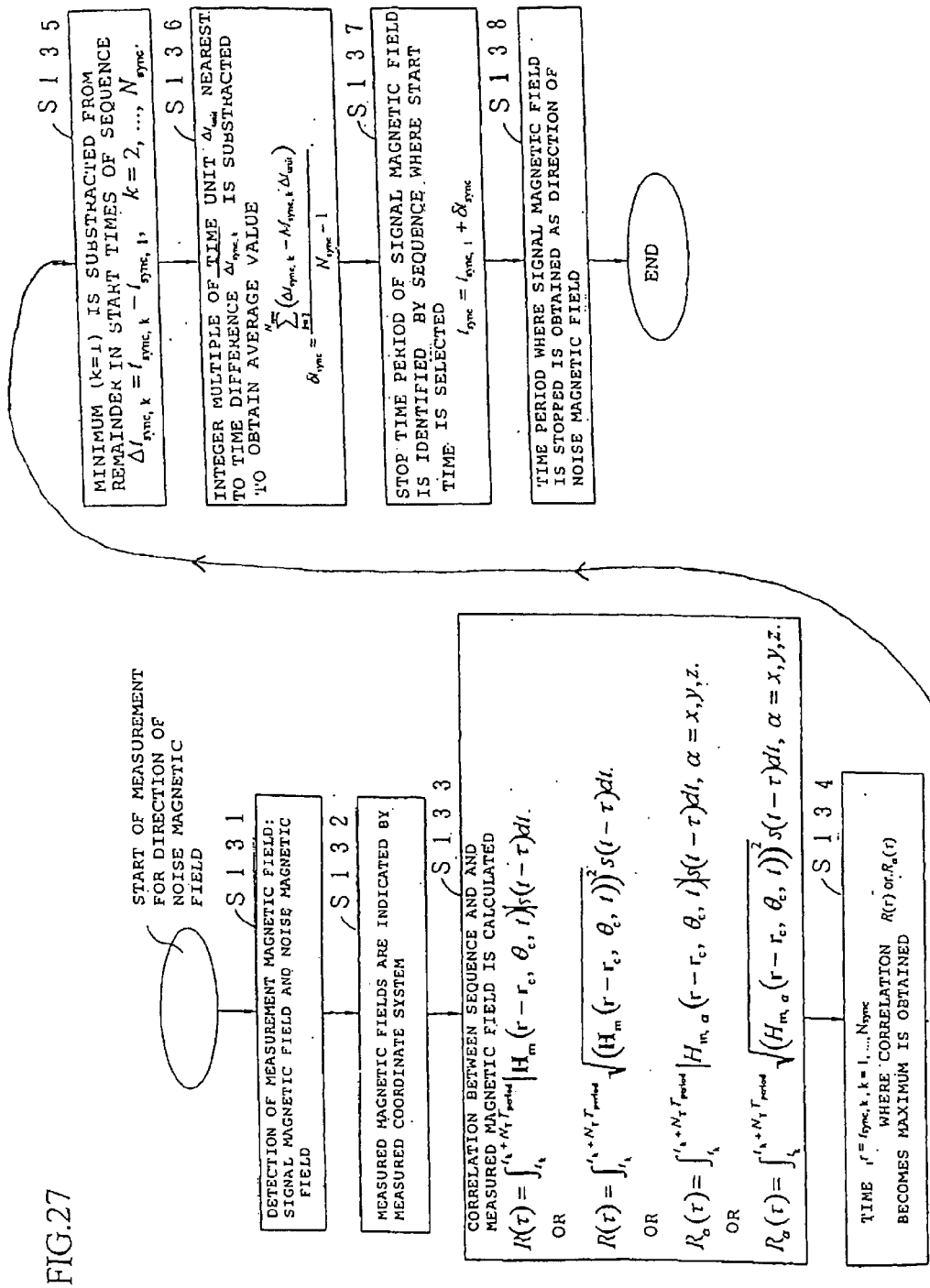
FIG. 27 is a flowchart showing a method of calculating the direction of the noise magnetic field according to the present invention in which the signal magnetic field is turned OFF on the basis of a predetermined sequence, and the starting time of a sequence indicating the most likely ON/OFF state of the signal magnetic field is calculated from a plurality of times when a correlation function between the predetermined sequence and the sensed magnetic field is at its

Next, as depicted in FIG. 27, the correlation function between the sequence s(t) and the norm of the measured magnetic field or the absolute value of its particular component is calculated (S131, S132, S133) as in the fifth method. It is possible to use any one of the following correlation functions:

$$R(\tau) = \int_{t_k}^{t_k+N_T T_{period}} |H_m(r-r_c, \theta_c, t)|s(t-\tau)dt. \qquad (43)$$

$$R(\tau) = \int_{t_k}^{t_k+N_T T_{period}} \sqrt{(H_m(r-r_c, \theta_c, t))^2}\, s(t-\tau)dt. \qquad (44)$$

$$R_\alpha(\tau) = \int_{t_k}^{t_k+N_T T_{period}} |H_{m,\alpha}(r-r_c, \theta_c, t)|s(t-\tau)dt,\ \alpha=x,y,z. \qquad (45)$$

$$R_\alpha(\tau) = \int_{t_k}^{t_k+N_T T_{period}} \sqrt{(H_{m,\alpha}(r-r_c, \theta_c, t))^2}\, s(t-\tau)dt,\ \alpha=x,y,z. \qquad (46)$$

Here, the period for detecting the correlation is set to an integral multiple $N_T T_{period}$ of the period $T_{period}$.

In this instance, there are present, in general, plural times $\tau=t_{sync,k}$ (k=1, 2, ..., $N_{sync}$) at which the correlation function is maximized and the maximum value exceeds a predetermined value (S134). It is assumed that $t_{sync,k}$ (k=1, 2, ..., $N_{sync}$) is an arrangement of such times in temporal order. When the correlation value between the sequence s(t) and the signal magnetic field is appropriate, $$\Delta t_{sync,k}=t_{sync,k}-t_{sync,1},\ k=2, \ldots, N_{sync}. \qquad (47)$$

is virtually an integral multiple of the time unit $\Delta t_{unit}$. The average of the value resulting from the subtraction of an integral multiple $M_{sync,k}\Delta t_{unit}$ of the time unit $\Delta t_{sync}$, where $k=2, \ldots, N_{sync,k}$, from $\Delta t_{sync,k}$, where $k=2, \ldots, N_{sync}$, is then calculated as $$\delta t_{sync} = \frac{\sum_{k=2}^{N_{sync}} (\Delta t_{sync,k} - M_{sync,k} \Delta t_{unit})}{N_{sync}-1}. \qquad (48)$$

In this case, $$t_{sync}=t_{sync,1}+\delta t_{sync} \qquad (49)$$

is the beginning of the sequence signal corresponding to the ON/OFF operation of the signal magnetic field.

Thus, the period during which the signal magnetic field is OFF can easily be set based on the sequence $s(t-t_{sync})$.

By applying the same method as method (1) to the magnetic field vector $H_m(r-r, \theta_c, t)$ measured in this period, the direction $e_n(r)$ of the noise magnetic field vector $H_n(r, t)$ can be calculated (S138).

Figure 28:
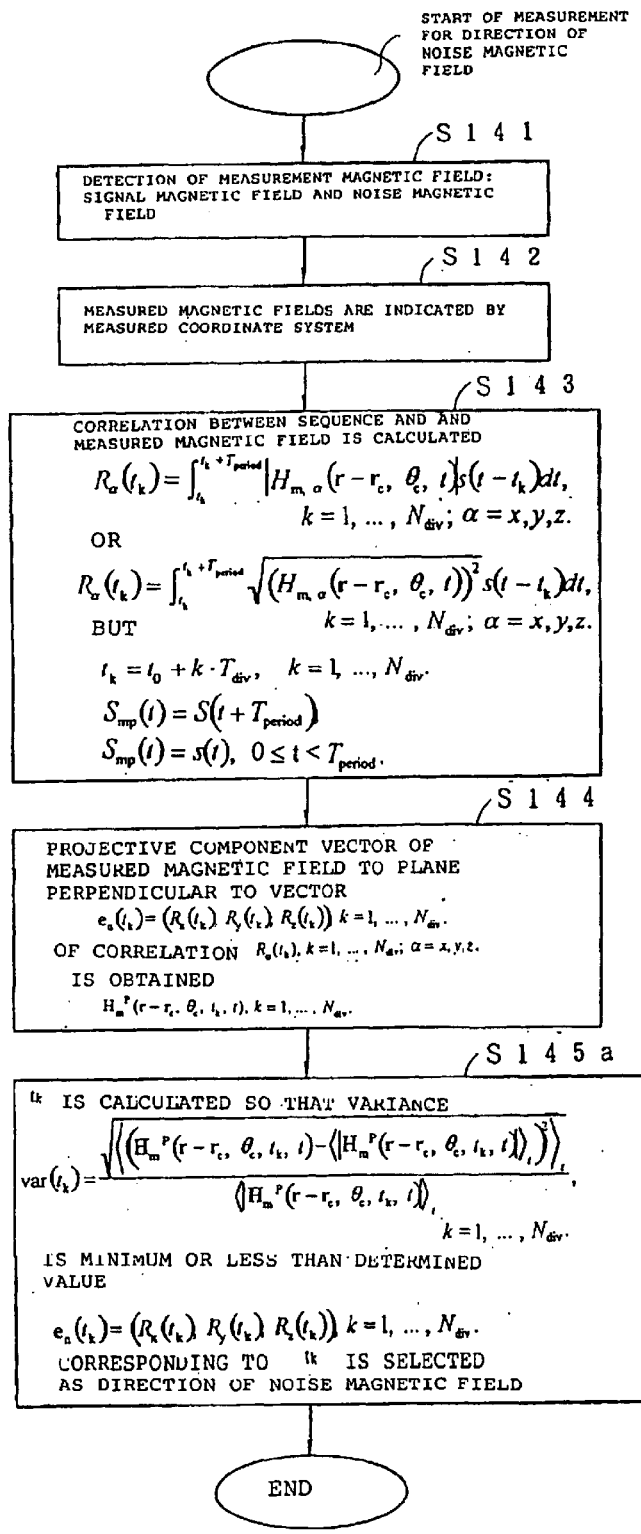
FIG. 28 is a flowchart showing the method of calculating the direction of the noise magnetic field according to the present invention in which the signal magnetic field is turned OFF on the basis of a predetermined sequence, where the correlation function between the predetermined sequence and the sensed magnetic field is calculated at each of a plurality of time points at which the period of the sequence is equally divided and the magnetic field is projected at each point in time to a vector formed by the calculated function, and one of vectors whose variation is minimal is regarded as the direction of the noise magnetic field.
Figure 29:
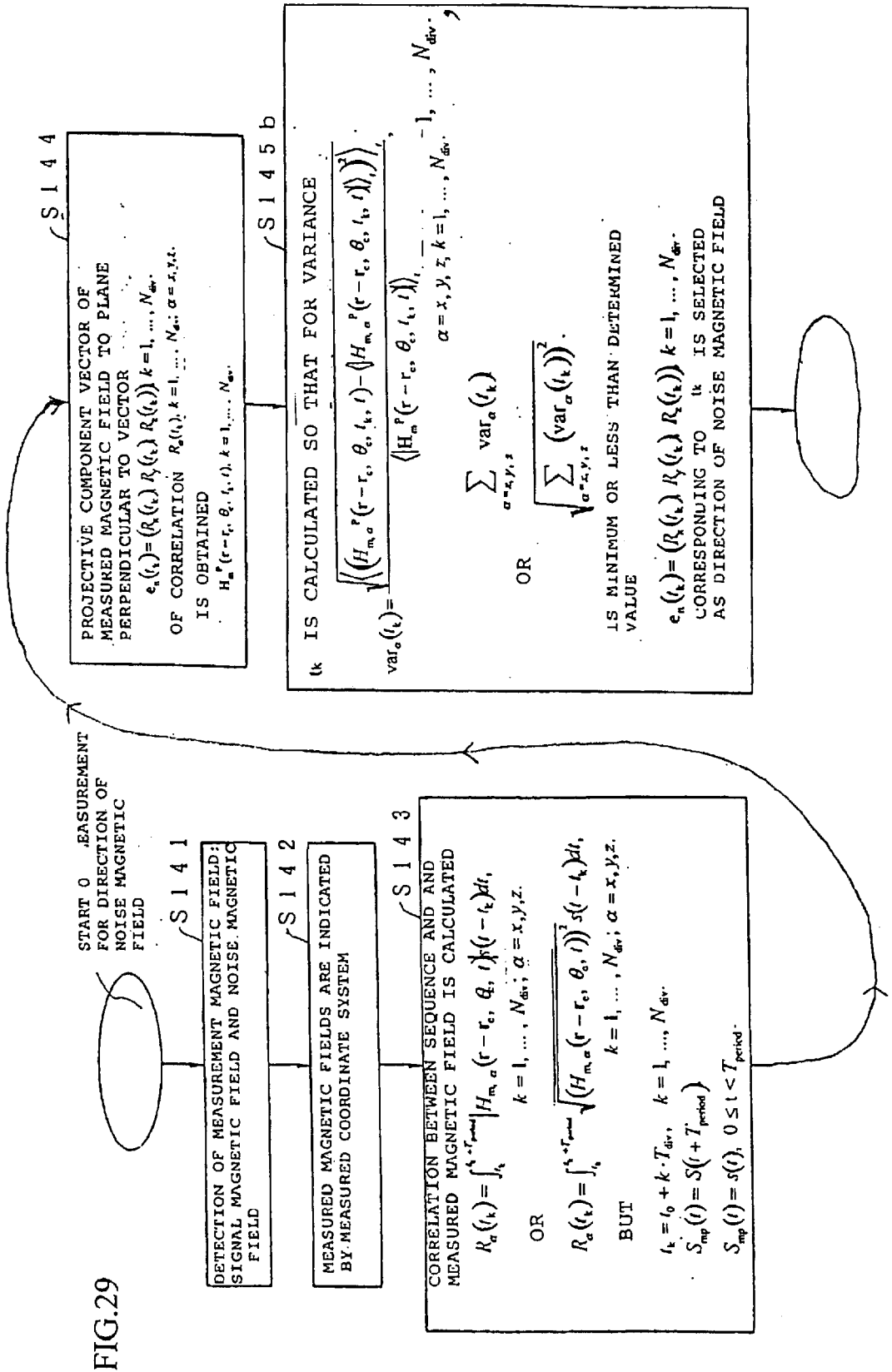
FIG. 29 is a flowchart showing another method for calculating the direction of the noise magnetic field according to the present invention in which the signal magnetic field is turned OFF on the basis of a predetermined sequence, where a correlation function between the predetermined sequence and the sensed magnetic field is calculated at each of a plurality of time points at which the period of the sequence is equally divided, the magnetic field is projected at each time point to a vector formed by the calculated function, and one of vectors whose variation is minimal is regarded as the direction of the noise magnetic field.
Figure 30:
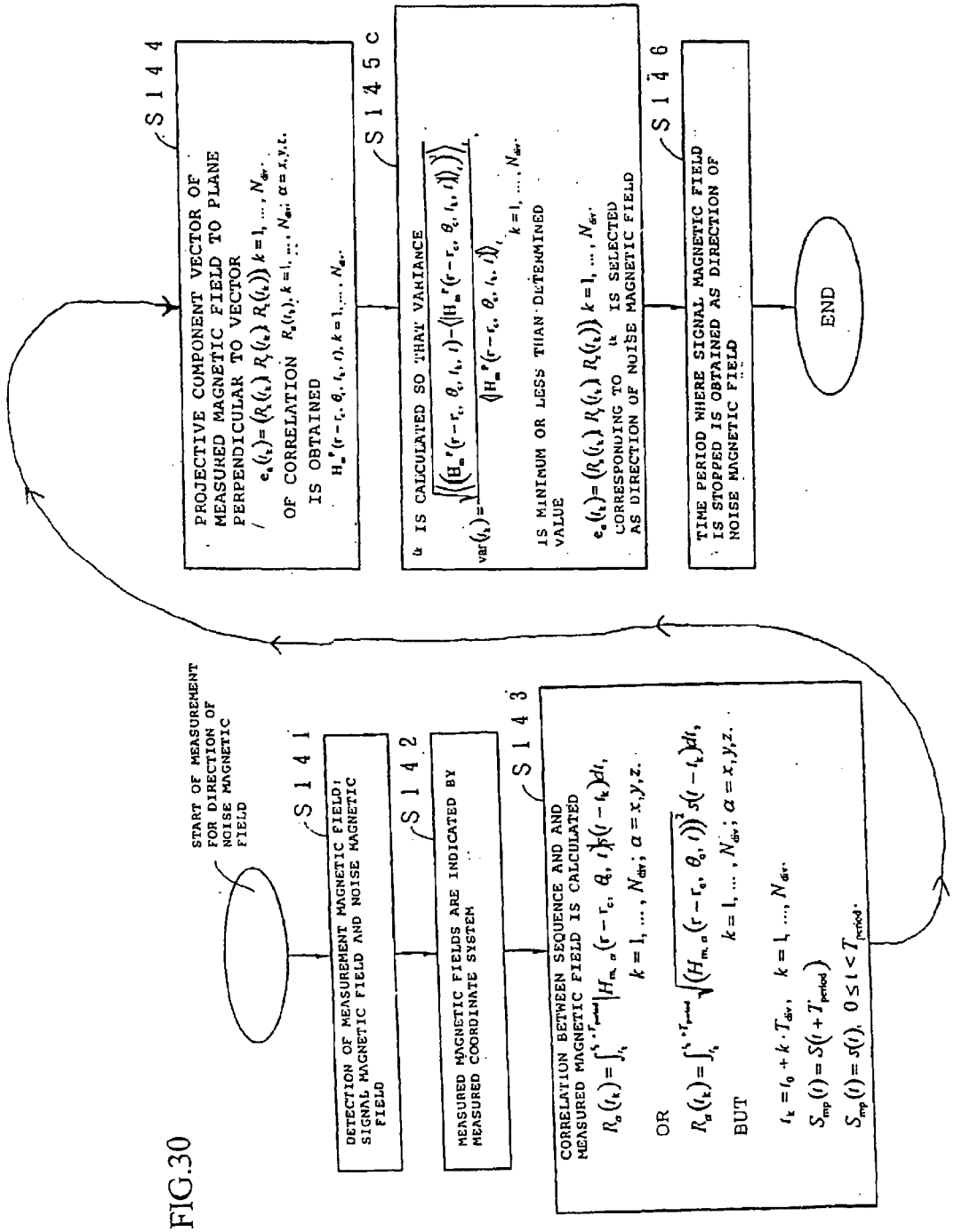
FIG. 30 is a flowchart showing a method of calculating the direction of the noise magnetic field according to the present invention in which the signal magnetic field is turned OFF on the basis of a predetermined sequence, and the starting time of a sequence indicating the most likely ON/OFF state of the signal magnetic field is calculated from a plurality of points in time when the correlation function between the predetermined sequence and the sensed magnetic field is at its maximum.
Figure 31:
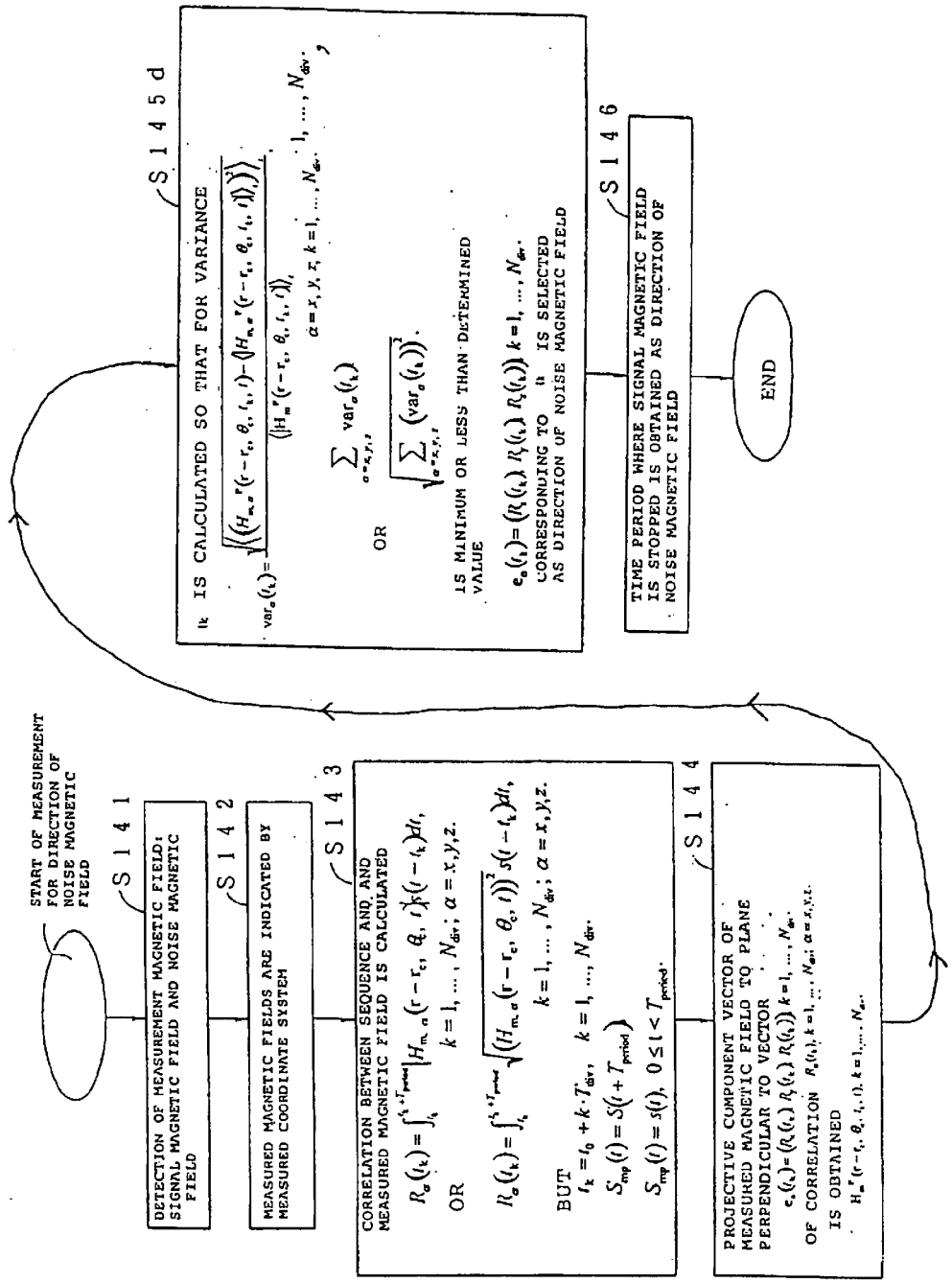
FIG. 31 is a flowchart showing yet another method of calculating the direction of the noise magnetic field according to the present invention in which the signal magnetic field is turned OFF on the basis of a predetermined sequence, a correlation function between the predetermined sequence and the sensed magnetic field is calculated at each of a plurality of points in time into which the period of the sequence is equally divided, the magnetic field is projected at each point in time to a vector formed by the calculated function, and one of the vectors whose variation is minimal is regarded as the direction of the noise magnetic field.

Method 7. With reference to FIGS. 28, 29, 30 and, and as is the case with the fifth method, the signal magnetic field is periodically stopped, for example, by a procedure such as those described below.

(1) To stop the signal magnetic field on a rectangular-wave-wise:

The signal magnetic field is repeatedly turned ON and OFF with the period $T_{period}$, for instance.

$$s(t) = 1, t_k \le t < t_k + t_{stop}. \quad (41)$$
$$= -1, t_k + t_{stop} \le t \le t_{k+1}.$$

and when a sequence s(t) is 1, the signal magnetic field is turned OFF, but when the sequence is −1, the signal magnetic field is turned ON. In the above, $$t_{k+1} - t_k = T_{period}, k=1, 2, 3, \quad (42)$$

(2) To stop the signal magnetic field on a pseudo-random-signal-wise basis:

For example, when the value is "−1" in a random sequence like an M-sequence consisting of unit periods $T_{unit}$ of the same length $N_M$, the signal magnetic field is turned ON. When the value is "1," however, the signal magnetic field is turned OFF; and this sequence is repeated accordingly. In this case, the time average of the sequence is "0."

Next, the correlation function between the sequence s(t) and the measured magnetic field $H_m(r-r_c, \theta_c, t)$ is calculated (S141, S142, S143). The period $T_{period}$ is divided into equally spaced $N_{div}$ sections of a length $T_{div}$, and either the following calculations is performed.

$$R_\alpha(t_k) = \int_{t_k}^{t_k + T_{period}} |H_{m,\alpha}(r - r_c, \theta_c, t)| s(t - t_k) dt, \quad (50)$$

$$k = 1, \ldots, N_{div}; \alpha = x, y, z.$$

$$R_\alpha(t_k) = \int_{t_k}^{t_k + T_{period}} \sqrt{(H_{m,\alpha}(r - r_c, \theta_c, t))^2} \, s(t - t_k) dt, \quad (51)$$

$$k = 1, \ldots, N_{div}; \alpha = x, y, z.$$

Here, the symbol $R_\alpha(t_k)$, where $\alpha=x, y, z$ and $k=1, \ldots, N_{div}$, is the time correlation between an α component $H_{m,\alpha}(r-r_c, \theta_c, t)$ of the measured magnetic field $H_m(r-r_c, \theta_c, t)$ and the sequence s(t). And $$t_k = t_0 + k \cdot T_{div}, k=1, \ldots, N_{div}. \quad (52)$$

The measured magnetic field may also be correlated with the time that is an m-multiple of the period $T_{period}$. That is, $$R_\alpha(t_k) = \int_{t_k}^{t_k + mT_{period}} |H_{m,\alpha}(r - r_c, \theta_c, t)| S_{mp}(t - t_k) dt, \quad (53)$$

$$k = 1, \ldots, N_{div}; \alpha = x, y, z.$$

$$R_\alpha(t_k) = \int_{t_k}^{t_k + mT_{period}} \sqrt{(H_{m,\alpha}(r - r_c, \theta_c, t))^2} \, S_{mp}(t - t_k) dt, \quad (54)$$

$$k = 1, \ldots, N_{div}; \alpha = x, y, z.$$

In this instance, the sequence s(t) is replaced with $S_{mp}(t)$, where $$S_{mp}(t) = S(t + T_{period})$$
$$S_{mp}(t) = s(t), 0 \le t < T_{period}. \quad (55)$$

The component $H_m^P(r-r_c, \theta_c, t_k, t)$ is then calculated, where k=1, . . . , $N_{div}$, of the measured magnetic field $H_m(r-r_c, \theta_c, t)$ projected on the vector $$e_n(t_k) = (R_x(t_k), R_y(t_k), R_z(t_k)), \text{ where } k=1, \ldots, N_{div}$$

formed by correlation functions $R_\alpha(t_k)$ where α=x, y, z, corresponding to the respective components x, y and z of the measured magnetic field $H_m(r-r_c, \theta_c, t)$. Here, a symbol $t_k$, contained as a variable of the projective component, indicates that the projective component depends on the variable $t_k$.

In this method, the vector $e_n(t_k)$ can be used as the direction of the noise magnetic field through utilization of the time $t_k$. In this time $t_k$, a fluctuation in the absolute value of the projective component vector $H_m(r-r_c, \theta_c, t_k, t)$, where k=1, . . . , $N_{div}$ $$\text{var}(t_k) = \frac{\sqrt{\langle (H_m^P(r - r_c, \theta_c, t_k, t) - \langle |H_m^P(r - r_c, \theta_c, t_k, t)| \rangle_t)^2 \rangle_t}}{\langle |H_m^P(r - r_c, \theta_c, t_k, t)| \rangle_t}, \quad (56)$$

$$k = 1, \ldots, N_{div}.$$

—is minimized or becomes smaller than a predetermined value (S145a). In the above, <.>, means the calculation of the tire average.

In addition, variations in the x-component $H_{m,x}(r-r_c, \theta_c, t_k, t)$, y-component $H_{m,y}(r-r_c, \theta_c, t_k, t)$ and z-component $H_{m,z}(r-r_c, \theta_c, t_k, t)$ of the projective component vector $H_m(r-r_c, \theta_c, t_k, t)$, where k=1, . . . , $N_{div}$, $$\text{var}_\alpha(t_k) = \frac{\sqrt{\langle (H_{m,\alpha}^P(r - r_c, \theta_c, t_k, t) - \langle |H_{m,\alpha}^P(r - r_c, \theta_c, t_k, t)| \rangle_t)^2 \rangle_t}}{\langle |H_m^P(r - r_c, \theta_c, t_k, t)| \rangle_t}, \quad (57)$$

$$\alpha = x, y, z; k = 1, \ldots, N_{div}.$$

are calculated, and the vector $e_n(t_k)$ can be used as the direction of the noise magnetic field by using the time $t_k$ in which the sum of the above-mentioned variations $$\sum_{\alpha=x,y,z} \text{var}_\alpha(t_k). \text{ or} \quad (58)$$

$$\sqrt{\sum_{\alpha=x,y,z} (\text{var}_\alpha(t_k))^2}. \quad (59)$$

is minimized or becomes smaller than a predetermined value (S145b). Here, it is possible that the correlation functions $R_x(t_k)$, $R_y(t_k)$ and $R_z(t_k)$ at a certain time $t_k$ may lose their original signs. Hence, it is necessary to evaluate the fluctuation of the projective component at each time $t_k$ for four combinations $[R_x(t_k), R_y(t_k), R_z(t_k)]$, $[R_x(t_k), R_y(t_k), -R_z(t_k)]$, $[R_x(t_k), -R_y(t_k), R_z(t_k)]$ and $[R_x(t_k), -R_y(t_k), -R_z(t_k)]$.

The period during which the signal magnetic field is OFF can also be easily set (S145c, S145d) based on the sequence $s(t-t_k)$. By applying the same method as method (1) to the magnetic field vector $H_n(r-r_c, \theta_c, t)$ as measured in this period, the direction $e_n(r)$ of the noise magnetic field vector $H_n(r, t)$ can be obtained (S146). Here, time $t_k$ of the equally spaced $N_{div}$ sections of the time length $T_{div}$ derived from the period $T_{period}$ can be used, but it is also possible to use the time at which the correlation function given by Eq. (45) or (46) is maximized or when the correlation function is maximized and exceeds a predetermined value.

Determining the direction of the noise magnetic field when the number of such fields is virtually two.

Even in a case of two noise magnetic fields, when a first one of the two noise magnetic fields has an intensity far greater than that of the second noise magnetic field at a first frequency, and the second noise magnetic field has an intensity far greater than that of the first noise magnetic field at the second frequency, the direction of the first and second noise magnetic field can easily be calculated through using these frequency components in the measured magnetic field.

If the first or second frequency is close to the frequency of the signal magnetic field, the directions of the noise magnetic fields can be determined from the measured magnetic field that has passed through a band pass filter that permits the passage of only those frequencies near the frequencies of the signal magnetic field, by the same method as methods (4) or (5), which are used in situations of virtually one noise magnetic field.

When either the first and second frequencies is not equal to the frequency of the signal magnetic field, the direction of the respective noise magnetic fields needs only be calculated by the method used in method (1) for situations of virtually one noise magnetic field.

The present invention can also be put to good use when the signal magnetic field generated by the magnetic field source is virtually axially symmetric, and the invention permits the determination of position with fewer magnetic sensors or by a magnetic field being sensed at fewer positions than with a magnetic field of low symmetry.

Further, there are cases in which only one noise magnetic field affects the measurement of the digging position and the tilt angle of the magnetic field source, which is an inclination of the axis of symmetry corresponding to the axial direction of the signal magnetic field set in the magnetic field set in the magnetic field source with respect to the vertical direction, is known. Here, the projective component of the magnetic field, measured at each of two or more different positions and on a plane perpendicular to the direction of the noise magnetic field sensed at each of the magnetic field sensing positions, is calculated. The position of the magnetic field source and its azimuth angle (the direction of the axis of symmetry in a horizontal plane) can be calculated from the above projective component.

In addition, according to this method of the subject invention, when virtually one noise magnetic field affects the measurement of the digging position, one can calculate the projective component of the magnetic field, measured at each of three or more different positions, on a plane perpendicular to the direction of the noise magnetic field sensed at each of the magnetic field sensing positions. The position of the magnetic field source, its tilt angle (an inclination of the axis of symmetry corresponding to the axial direction of the signal magnetic field set in the magnetic field source with respect to the vertical direction), and the azimuth angle of the magnetic field source (the direction of the axis of symmetry in the horizontal plane) can be calculated from the above projective component.

There are situations in which virtually two noise magnetic fields alone affect the measurement of the digging position and the tilt angle of the magnetic field source, which is an inclination of the axis of symmetry corresponding to the axial direction of the signal magnetic field set in the magnetic field source with respect to the vertical direction, is known. Here, the projective component of the magnetic field, measured at four or more positions, on a straight line perpendicular to both the direction of a first of two noise magnetic fields sensed at each magnetic field sensing position and the direction of the other of the two noise magnetic fields sensed at the same position, can be calculated, and the position of the magnetic field source and its azimuth angle that is the direction of the axis of symmetry in the horizontal plane can be calculated from the above projective component Further, in situations where virtually two noise magnetic fields alone affect the measurement of the digging position, the projective component of the magnetic field, measured at five or more positions, on a straight line perpendicular to both the direction of the first of two noise magnetic fields sensed at each magnetic field sensing position and the direction of the other noise magnetic field sensed at the same position can be calculated. Here, the position of the magnetic field source, its tilt angle that is an inclination of the axis of symmetry corresponding to the axial direction of the signal magnetic field set in the magnetic field source with respect to the vertical direction, and the azimuth angle that is the direction of the axis of symmetry in the horizontal plane can be calculated from the above projective component.

Moreover, when virtually two noise magnetic fields alone affect the measurement of the digging position, the frequency component of the first of two noise magnetic fields, near which the remaining second noise magnetic field and the signal magnetic field have substantially no frequency components, is measured in order to permit detection of the direction of the first noise magnetic field in terms of a vector. Here, as well, the frequency component of the second noise magnetic fields, near which the first noise magnetic field and the signal magnetic field have substantially no frequency components, is measured in order to detect the direction of the second noise magnetic field in terms of a vector.

In the subject invention, a three-axis magnetic sensor that senses three magnetic fields orthogonal to one another at substantially the same position is effective as a magnetic sensor.

However, the magnetic sensor in the present invention may be any kind sensor as long as it can function in three magnetic fields orthogonal to one another at substantially the same position. The three-axis magnetic sensor is suitable because it senses three magnetic fields orthogonal to one another at substantially the same position. In alternatively, one magnetic sensor that is capable of sensing a magnetic field in only one direction can be turned in the same position to face three different orthogonal directions in sequence to sense the three orthogonal magnetic fields.

Figure 32:
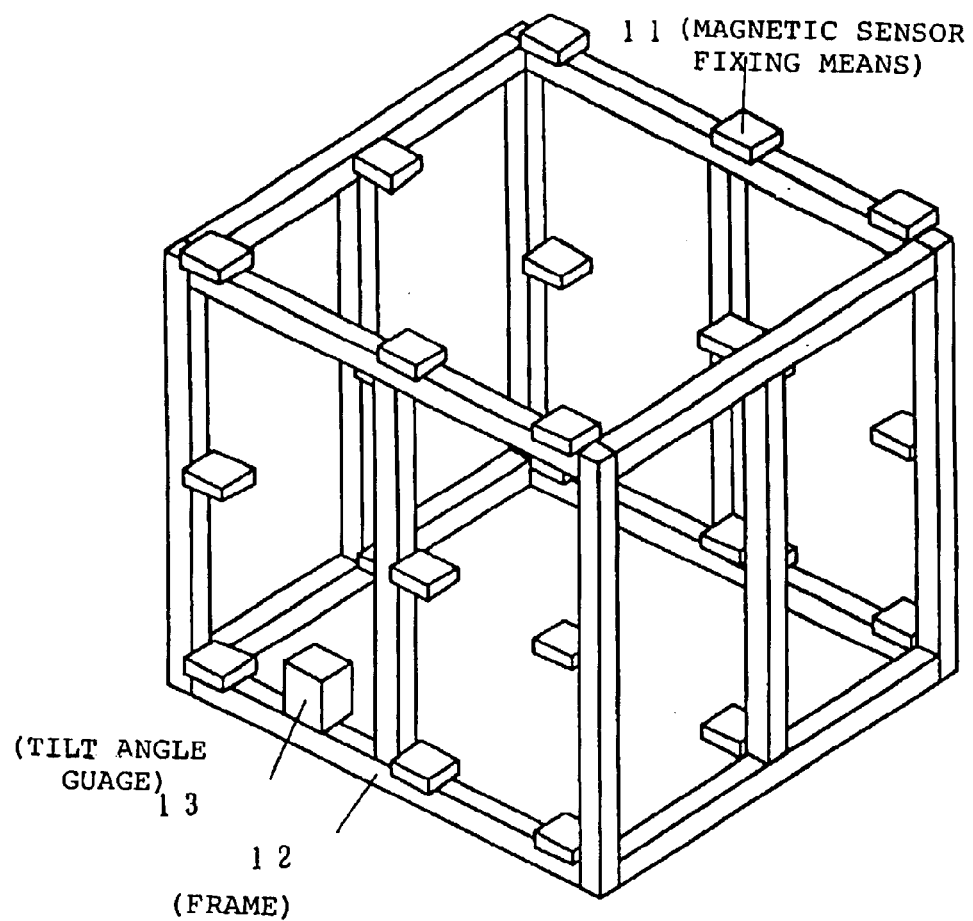
FIG. 32 is a perspective view depicting an example of a magnetic field sensing frame for use in the present invention.

In employing the present invention, one can use a frame such as frame 12 depicted in FIG. 32, which has a magnetic sensor fixing means 11 mounted on it so that it can fix three-axis magnetic sensors and a tilt angle gauge 13 for detecting the inclination of the frame with respect to a vertical direction. The position of each magnetic sensor fixing means on the frame is known, and the magnetic sensor fixing means acts to fix the magnetic sensor in a predetermined orientation to the frame. The magnetic sensor fixing means 11 can be provided with three faces orthogonal to one another, and has a mechanism that fixes the magnetic sensor at a predetermined angle when a predetermined face of the sensor case is pressed against any of the three faces of the sensor fixing means. One magnetic sensor or one three-axis magnetic sensor is fixed to these magnetic sensor fixing means one after another to sense the magnetic fields.

In another alternative, a plurality of magnetic sensors may be fixed in predetermined orientations to the frame 12 at a plurality of positions to simultaneously sense magnetic fields at this plurality of positions.

As described above, the present invention employs a fame provided with a plurality of magnetic sensor fixing means each capable of removably or fixedly mounting a three-axis magnetic sensor and a tilt angle sensor capable of detecting the tilt angle of an orthogonal coordinate system to the vertical direction. The magnetic fixing means are mounted on the frame so that their positions and orientations are known. And the magnetic sensor is removably or fixedly mounted on a required number of magnetic sensor fixing means to sense magnetic fields, while the tilt angle of the frame during magnetic field sensing and the orientation of the magnetic sensor at each magnetic sensor mounting position toward the frame are used to calculate, from the magnetic field sensed at each magnetic sensor mounting position, the sensed magnetic field, a noise magnetic field and a signal magnetic field as vectors in a coordinate system fixed to the ground.

The magnetic field generating means for the signal magnetic field in the present invention may be a coil. The magnetic field generating means may also be one electric wire, or one electric wire that is straight only near the place of the determination of position.

Even if a buried power line, railroad tracks, or similar noise magnetic sources are present near a construction site, the subject invention will afford a highly reliable determination of position and will note be affected by the noise magnetic fields generated by such noise magnetic field sources.

The present invention is intended for measuring the digging position in the non-open-cut method of excavation, but is applicable as well to many technical fields that determine position by means of sensing magnetic fields.

What I claim is:

1. A method of determining a digging position of a digging head for a substantially horizontal boring or trenching method of excavation in a region of a noise magnetic field generated by a nearby current, comprising the steps of:

sensing an AC magnetic field radiated from a magnetic field source associated with the digging head by an above-ground magnetic sensor, and calculating at least one of the positions of the magnetic field source from the magnitude and direction of the sensed magnetic field, at least one of the position of said magnetic field source, the tilt angle of said magnetic field source to the vertical direction and the azimuth of said magnetic field source that is its axial direction in a horizontal plane being calculated by using a projective component of said magnetic field, sensed by said magnetic sensor, on a straight body orthogonal to a vector-valued direction of said noise magnetic field.

2. A method for determining a digging position according to claim 1, characterized in that a vector-valued direction of said noise magnetic field is detected prior to the position determination in the absence of any nearby magnetic field source.

3. A method for determining a digging position according to claim 1, characterized in that a vector-valued direction of the frequency component of said noise magnetic field different from the frequency component of said signal magnetic field is detected and is regarded as a vector-valued direction of a noise magnetic field of the same frequency component as that of said signal magnetic field.

4. A method for determining a digging position according to claim 3, characterized in that:

a vector-valued direction of the frequency component of each sensed magnetic field different from the frequency component of said signal magnetic field is calculated; and a vector-valued direction of the frequency component of said noise magnetic field, at which a fluctuation in the amplitude or direction of a projective component of said sensed magnetic field on a plane or line orthogonal to said vector-valued direction of said sensed magnetic field becomes minimum or smaller than a predetermined value, is regarded as a vector-valued direction of said noise magnetic field of the same frequency component as that of said signal magnetic field.

5. A method for determining a digging position according to claim 4, characterized in that:

a vector-valued direction of a line spectrum component of said noise magnetic field of a frequency component different from that of said signal magnetic field is calculated; and a vector-valued direction of the line spectrum component of said noise magnetic field, at which a fluctuation in the amplitude or direction of a projective component of said sensed magnetic field on a plane or line orthogonal to said vector-valued direction of said noise magnetic field becomes minimum or smaller than a predetermined value, is regarded as a vector-valued direction of said noise magnetic field of the same frequency component as that of said signal magnetic field.

6. A method for determining a digging position according to claim 1, characterized in that: said signal magnetic field is turned OFF by a predetermined procedure; the OFF period of said signal magnetic field is estimated; and the direction of said sensed magnetic field during said OFF period is regarded as said vector-valued direction of said noise magnetic field.

7. A method for determining a digging position according to claim 6, characterized in that: a decrease in the intensity of said sensed magnetic field is detected to thereby estimate the OFF period of said signal magnetic field.

8. A method for determining a digging position according to claim 6, characterized in that:

said signal magnetic field is periodically turned OFF by a predetermined procedure;

a time correlation function in a finite period is calculated between a sequence, which takes a first numerical value during the OFF period of said signal magnetic field and a second numeral value different from said first value during an ON period of said signal magnetic field and is a time function of a "0" time average, and the absolute value of said sensed magnetic field or square root of said absolute value, or the absolute value of each vector-valued component of said sensed magnetic field or square root of said absolute value; and a period is set during which said signal magnetic field is held OFF by said sequence that maximizes and minimizes said time correlation function when said first numerical value is larger than said second numerical value and minimizes said time correlation function when said first numerical value is smaller than said second numerical value, and the direction of said sensed magnetic field in said period is regarded as the direction of said noise magnetic field.

9. A method for determining a dining position according to claim 6, characterized in that:

said signal magnetic field is periodically turned OFF by a predetermined procedure;

said signal magnetic field is turned ON and OFF with a predetermined period following a sequence that takes a first numerical value during the OFF period of said signal magnetic field and a second numeral value different from said first value during an ON period of said signal magnetic field and is a time function of a "0" time average;

a time correlation function in a finite period is calculated between said sequence and the absolute value of said sensed magnetic field or square root of said absolute value, or the absolute value of each vector-valued component of said sensed magnetic field or square root of said absolute value;

a plurality of starting times of said sequence, which maximizes said time correlation function in excess of a predetermined value when said first numerical value is larger than said second numerical value and minimizes said time correlation function when said first numerical value is smaller than said second numerical value, is set;

the first one of said plurality of starting times is subtracted from the remaining other starting times to obtain the time difference and an average value of said remaining starting times except an integral multiple of a period closest to said time difference is calculated; and a period is set during which said signal magnetic field is held OFF by a sequence whose starting time is the sum of said average value and said first starting time, and the direction of said sensed magnetic field during said period is regarded as the direction of said noise magnetic field.

10. A method for determining a digging position according to claim 6, characterized in that:

said signal magnetic field is periodically turned OFF by a predetermined procedure;

a time correlation function in a finite period is calculated between a sequence, which takes a first numerical value during the OFF period of said signal magnetic field and a second numeral value different from said first value during an ON period of said signal magnetic field and is a time function of a "0" time average, and the absolute value of each vector-valued component of said sensed magnetic field or a square root of said absolute value; and the direction of a vector formed by said three time correlation functions, in which a fluctuation in the amplitude or direction of a projective component of said sensed magnetic field on a plane or line orthogonal to the direction of said vector becomes minimum, is regarded as the direction of said noise magnetic field.

11. A method for determining a digging position according to claim 6, characterized in that:

said signal magnetic field is periodically turned OFF by a predetermined procedure;

a period longer than the period for which said signal magnetic field is held OFF is divided into time intervals shorter than said signal magnetic field OFF period, and a vector-valued direction of said sensed magnetic field during each of said time intervals is detected; and a vector-valued direction of said each time interval, in which a fluctuation in the amplitude or direction of a projective component of said sensed magnetic field on a plane or line orthogonal to a vector-valued direction of said sensed magnetic field in said each time interval becomes minimum, is regarded as a vector-valued direction of said noise magnetic field.

12. A method for determining a digging position according to claim 6, characterized in that:

said signal magnetic field is periodically turned OFF by a predetermined procedure;

time correlation functions in a finite period are calculated between a sequence, which takes a first numerical value during the OFF period of said signal magnetic field and a second numeral value different from said first value during an ON period of said signal magnetic field and is a time function of a "0" time average, and the absolute values of three vector-valued components of said sensed magnetic field or square roots of said absolute values; and the time for executing one round of said sequence is divided into time intervals shorter than said signal magnetic field OFF period, and a vector-valued direction of each of said time intervals, in which a fluctuation in the amplitude or direction of a projective component of said sensed magnetic field on a plane or line orthogonal to vectors of three components of said time correlation functions becomes minimum at a representative time of said each time interval, is regarded as a vector-valued direction of said noise magnetic field.

13. A method for determining a digging position according to claim 1, characterized in that said signal magnetic field generated by said magnetic field source is virtually symmetrical with respect to one axis of symmetry.

14. A method for determining a digging position as claimed in claim 13, characterized in that:

when the number of noise magnetic fields affecting the digging position determination is virtually only one and the tilt angle of said magnetic field source is known which is an inclination of the axis of symmetry corresponding to the axial direction of said signal magnetic field set in said magnetic field source with respect to the vertical direction, a projective component of a magnetic field, sensed at each of two or more different positions, on a plane orthogonal to the direction of said noise magnetic field sensed at each of said magnetic field sensing positions is calculated; and the position of the magnetic field source and the azimuth angle of said magnetic field source that is the direction of said axis of symmetry in a horizontal plane are calculated from said projective component or a signal magnetic field component obtained by synchronous detection of the original sensed magnetic field through the use of said projective component as a reference signal.

15. A method for determining a digging position according to claim 1, characterized in that:

when the number of noise magnetic fields affecting the digging position determination is virtually only one, a projective component of a magnetic field, sensed at each of three or more different positions, on a plane orthogonal to the direction of said noise magnetic field sensed at each of said magnetic field sensing positions is calculated; and the position of the magnetic field source, the tilt angle of said magnetic field source that is an inclination of the axis of symmetry corresponding to the axial direction of said signal magnetic field set in said magnetic field source with respect to the vertical direction, and the azimuth angle of said magnetic field source that is the direction of said axis of symmetry in a horizontal plane are calculated from said projective component or a signal magnetic field component obtained by synchronous detection of the original sensed magnetic field through the use of said projective component as a reference signal.

16. A method for determining a digging position according to claim 1, characterized in that:

when the number of noise magnetic fields affecting the digging position determination is virtually only one and the tilt angle of said magnetic field source is known which is an inclination of the axis of symmetry corresponding to the axial direction of said signal magnetic field set in said magnetic field source with respect to the vertical direction, a projective component of said magnetic field, sensed at each of four or more different positions, on a plane orthogonal to the directions of both first and second noise magnetic fields sensed at each of said magnetic field sensing positions is calculated; and the position of the magnetic field source and the azimuth angle of said magnetic field source that is the direction of said axis of symmetry in a horizontal plane are calculated from said projective component or a signal magnetic field component obtained by synchronous detection of the original sensed magnetic field through the use of said projective component as a reference signal.

17. A method for determining a digging position according to claim 1, characterized in that:

when the number of noise magnetic fields affecting the digging position determination is virtually only first and second noise magnetic fields, a projective component of said magnetic field, sensed at each of four or more different positions, on a plane orthogonal to the directions of both said first and second noise magnetic fields sensed at each of said magnetic field sensing positions is calculated; and the position of the magnetic field source, the tilt angle of said magnetic field source that is an inclination of the axis of symmetry corresponding to the axial direction of said signal magnetic field set in said magnetic field source with respect to the vertical direction, and the azimuth angle of said magnetic field source that is the direction of said axis of symmetry in a horizontal plane are calculated from said projective component or a signal magnetic field component obtained by synchronous detection of the original sensed magnetic field through the use of said projective component as a reference signal.

18. A method for determining a digging position according to claim 1, characterized in that:

when the number of noise magnetic fields affecting the digging position determination is virtually only first and second noise magnetic fields, the frequency component of said first noise component, around which said second noise magnetic field and said signal magnetic field have substantially no frequency components, are measured to thereby obtain a vector-valued direction of said first noise magnetic field, and the frequency component of said second noise component, around which said first noise magnetic field and said signal magnetic field have substantially no frequency components, are measured to thereby obtain a vector-valued direction of said second noise magnetic field.

19. A method for determining a digging position according to claim 1, characterized in that said magnetic sensor is a three-axis magnetic sensor that senses magnetic fields of three axial directions orthogonal to one another at substantially the same position.

20. A method for determining a digging position according to claim 19, characterized in that:

a frame is used which is provided with magnetic sensor fixing means for removably or fixedly mounting said three-axis magnetic sensor; and said frame is provided with a tilt angle sensor fixed to said frame, for sensing the tilt angle of an orthogonal coordinate system to a vertical direction;

wherein: other magnetic fields are sensed by said three-axis magnetic sensor removably or fixedly mounted on each of a required number of magnetic sensor fixing means that are mounted on said frame so that the position and orientation of said magnetic sensor fixing means with respect to said frame are known; and the tilt angle of said frame at the time of sensing said other magnetic fields and the orientation of said three-axis magnetic sensor at each three-axis magnetic sensor mounting position with respect to said frame are used to calculate said sensed magnetic field, said noise magnetic field and said signal magnetic field as vectors in a coordinate system fixed to the ground from said other magnetic fields sensed at said each three-axis magnetic sensor mounting position.

21. A method for determining a digging position according to claim 19, characterized in that said other magnetic fields are sensed by said three-axis magnetic sensor fixed at each of a required number of magnetic sensor mounting positions.

22. A method for determining a digging position according to claim 19, characterized in that magnetic fields are sensed by one three-axis magnetic sensor that is removably mounted at said required number of magnetic sensor mounting positions one after another.

23. A method for determining a digging position according to claim 1, characterized in that said magnetic field generating means is a coil.

24. A method for determining a digging position according to claim 1, characterized in that said magnetic field generating means is an electric wire.

25. A method for determining a digging position according to claim 1, characterized in that said magnetic field generating means is a straight electric wire disposed in the vicinity of the magnetic field sensing position.

26. A method of determining a digging position of a digging head for a substantially horizontal boring or trenching method of excavation in a region of a noise magnetic field generated by a nearby current, comprising the steps of:

sensing an AC magnetic field radiated from a magnetic field source associated with the digging head by an above-ground magnetic sensor, and calculating at least one of the positions of the magnetic field source from the magnitude and direction of the sensed magnetic field, at least one of the positions of said magnetic field source, the tilt angle of said magnetic field source to the vertical direction and the azimuth of said magnetic field source that is its axial direction in a horizontal plane being calculated by using a signal magnetic field component obtained from the synchronous detection of an original sensed magnetic field by using a projective component of said magnetic field as a reference signal.

* * * * *